United States Patent
Zhang et al.

(10) Patent No.: US 12,300,241 B2
(45) Date of Patent: May 13, 2025

(54) SPEECH SIGNAL PROCESSING METHOD AND RELATED DEVICE THEREOF

(71) Applicant: HUAWEI TECHNOLOGIES CO., LTD., Guangdong (CN)

(72) Inventors: Libin Zhang, Beijing (CN); Hui Yang, Beijing (CN); Shu Fang, Beijing (CN); Siwei Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 17/994,968

(22) Filed: Nov. 28, 2022

(65) Prior Publication Data

US 2023/0098678 A1 Mar. 30, 2023

Related U.S. Application Data

(63) Continuation of application No. PCT/CN2020/093523, filed on May 29, 2020.

(51) Int. Cl.
*G10L 15/16* (2006.01)
*G06V 40/16* (2022.01)
*G10L 15/24* (2013.01)

(52) U.S. Cl.
CPC ............ *G10L 15/24* (2013.01); *G06V 40/171* (2022.01); *G10L 15/16* (2013.01)

(58) Field of Classification Search
None
See application file for complete search history.

(56) References Cited

U.S. PATENT DOCUMENTS

| 11,282,523 B2* | 3/2022 | Gross | G10L 15/22 |
| 2010/0204987 A1* | 8/2010 | Miyauchi | G10L 15/25 |
| | | | 704/E15.001 |
| 2015/0045007 A1 | 2/2015 | Cash | |
| 2016/0011063 A1* | 1/2016 | Zhang | A61B 5/11 |
| | | | 600/301 |

(Continued)

FOREIGN PATENT DOCUMENTS

| CN | 1622200 A | 6/2005 |
| CN | 101947152 A | 1/2011 |

(Continued)

OTHER PUBLICATIONS

Intelligent Noise Detection and Control—Active Noise Control (ANC) technology, 2011, with the English Translation, 26 pages.

(Continued)

*Primary Examiner* — Neeraj Sharma

(57) ABSTRACT

A speech signal processing method and a related device thereof are provided. The method may be applied to the audio field and includes: obtaining a user speech signal captured by a sensor; obtaining a corresponding vibration signal when a user generates a speech, where the vibration signal indicates a vibration feature of a body part of the user, and the body part is a part that vibrates correspondingly based on sound-making behavior when the user is making a sound; and obtaining target speech information based on the vibration signal and the user speech signal captured by the sensor. In this application, the vibration signal is used as a basis for speech recognition.

20 Claims, 19 Drawing Sheets

(56) References Cited

U.S. PATENT DOCUMENTS

| | | | | |
|---|---|---|---|---|
| 2016/0203002 | A1* | 7/2016 | Kannan | G06F 3/162 |
| | | | | 715/708 |
| 2016/0267911 | A1* | 9/2016 | Koetje | H04R 3/04 |
| 2016/0285793 | A1* | 9/2016 | Anderson | H04L 51/046 |
| 2017/0011210 | A1* | 1/2017 | Cheong | A61B 5/681 |
| 2017/0235364 | A1* | 8/2017 | Nakamura | G06F 3/016 |
| | | | | 345/156 |
| 2017/0238144 | A1* | 8/2017 | Chatani | G06V 40/20 |
| | | | | 455/456.3 |
| 2018/0124458 | A1* | 5/2018 | Knox | H04N 21/4223 |
| 2018/0232511 | A1 | 8/2018 | Bakish | |
| 2019/0043512 | A1* | 2/2019 | Huang | G10L 17/26 |
| 2019/0182415 | A1* | 6/2019 | Sivan | G06F 3/013 |
| 2019/0272325 | A1* | 9/2019 | Korn | G10L 13/08 |
| 2019/0348041 | A1* | 11/2019 | Cella | G10L 15/30 |
| 2020/0005770 | A1 | 1/2020 | Lunner et al. | |
| 2020/0077206 | A1 | 3/2020 | Jensen et al. | |

FOREIGN PATENT DOCUMENTS

| | | |
|---|---|---|
| CN | 102027536 A | 4/2011 |
| CN | 103871419 A | 6/2014 |
| CN | 105632512 A | 6/2016 |
| CN | 106778186 A | 5/2017 |
| CN | 106872011 A | 6/2017 |
| CN | 108805087 A | 11/2018 |
| CN | 109104209 A | 12/2018 |
| CN | 109151530 A | 1/2019 |
| CN | 109241912 A | 1/2019 |
| CN | 110248281 A | 9/2019 |
| CN | 110366086 A | 10/2019 |
| CN | 110931031 A | 3/2020 |
| JP | 2010217453 A | 9/2010 |

OTHER PUBLICATIONS

James A. O Sullivan et al, Feature Article, Attentional Selection in a Cocktail Party Environment Can Be Decoded from Single-Trial EEG, Cerebral Cortex Jul. 2015;25:1697-1706, doi:10.1093/cercor/bht355, Advance Access publication Jan. 15, 2014, 10 pages.

Xiaoya Li et al, Lip Reading Deep Network Exploiting Multi-modal Spiking Visual and Auditory Sensors, 2019 IEEE, 5 pages.

Cong Han et al, Speaker-independent auditory attention decoding without access to clean speech sources, Science Advances, Research Article, May 15, 2019, 12 pages.

Gopala K. Anumanchipalli et al, Speech synthesis from neural decoding of spoken sentences, Nature vol. 568, pp. 493-498 (2019), 20 pages.

Wang Dongxia, Study on Methods for Speech Enhancement based on Microphone Array, School of Electronic and Information Engineering Dalian University of Technology, Dalian, Liaoning, P.R. China, 116024 , Apr. 2007, with the English Abstract, 126 pages.

* cited by examiner

SPEECH SIGNAL PROCESSING METHOD AND RELATED DEVICE THEREOF

CROSS-REFERENCE TO RELATED APPLICATIONS

This application is a continuation of International Application No. PCT/CN2020/093523, filed on May 29, 2020, the disclosure of which is hereby incorporated by reference in its entirety.

TECHNICAL FIELD

This application relates to the audio processing field, and in particular, to a speech signal processing method and a related device thereof.

BACKGROUND

Human-computer interaction (HCI) focuses on information exchange between humans and computers. It mainly includes two parts: human-to-computer information exchange and computer-to-human information exchange. Human-computer interaction is a comprehensive subject closely related to cognitive psychology, ergonomics, multimedia technologies, virtual reality technologies, and the like. In human-computer interaction technologies, a multimodal interaction device is an interaction device that parallelly implements a plurality of interaction modes such as speech interaction, somatosensory interaction, and touch interaction. In human-computer interaction of the multimodal interaction device, user information is captured by a plurality of tracking modules (face, gesture, posture, speech, and rhythm) in the interaction device, and is then interpreted, processed, and managed to form a virtual user expression module; and an interactive dialog is carried out with a computer. In this way, user interaction experience can be greatly improved.

With development of speech technologies, a plurality of intelligent devices (for example, a mobile phone, a companion robot, a vehicle-mounted device, a smart sound box, and an intelligent speech assistant) can interact with a user through speech. A speech interaction system of an intelligent device completes an instruction of the user by recognizing a speech of the user. In the foregoing intelligent device, a microphone is usually used to pick up an audio signal in an environment, where the audio signal is a mixed signal of the environment. In addition to a speech signal that the intelligent device expects to pick up from a user, there are other signals such as ambient noise and a voice of another person.

In an existing implementation, to extract a speech signal from a user from a mixed signal, a blind separation method may be used, which is essentially a statistical-based method to separate a sound source. Therefore, limited by an actual modeling method, it is very challenging in terms of robustness.

SUMMARY

According to a first aspect, this application provides a speech signal processing method. The method includes the following content.

A user speech signal captured by a sensor is obtained.

It should be noted that, the user speech signal should not be understood as only an utterance of a user, but should be understood as that a speech signal includes a speech generated by the user. That the speech signal includes ambient noise may be understood as that a user who is speaking and other ambient noise (for example, another person who is speaking) exist in the environment. In this case, the captured speech signal includes a voice of the user and the ambient noise that are mixed together, and a relationship between the speech signal and the ambient noise should not be understood as being simply superposed. In other words, it should not be understood that the ambient noise exists as an independent signal in the speech signal.

A corresponding vibration signal is obtained when the user generates a speech, where the vibration signal indicates a vibration feature of a body part of the user, and the body part is a part that vibrates correspondingly based on sound-making behavior when the user is making a sound.

It should be noted that the corresponding vibration signal when the user generates the speech may be obtained through extraction from video.

Target speech information is obtained based on the vibration signal and the user speech signal captured by the sensor.

An embodiment of this application provides the speech signal processing method, including: obtaining the user speech signal captured by the sensor, where the speech signal includes the ambient noise; obtaining the corresponding vibration signal when the user generates the speech, where the vibration signal indicates the vibration feature of the body part of the user, and the body part is the part that vibrates correspondingly based on the sound-making behavior when the user is making a sound; and obtaining the target speech information based on the vibration signal and the user speech signal captured by the sensor. In the foregoing manner, the vibration signal is used as a basis for speech recognition. Because the vibration signal does not include an external non-user speech mixed during complex acoustic transmission, and is slightly affected by other ambient noise (for example, affected by reverberation), this part of noise interference can be well suppressed, and good speech recognition effect can be achieved.

In an optional implementation, the vibration signal indicates a vibration feature corresponding to a vibration generated when the user generates the speech.

In an optional implementation, the body part includes at least one of the following: a calvarium, a face, a larynx, or a neck.

In an optional implementation, the obtaining the corresponding vibration signal when the user generates the speech includes: obtaining a video frame including the user; and extracting, based on the video frame, the corresponding vibration signal when the user generates the speech.

In an optional implementation, the video frame is captured by using a dynamic vision sensor and/or a high-speed camera.

In an optional implementation, the obtaining the target speech information based on the vibration signal and the user speech signal captured by the sensor includes: obtaining a corresponding target audio signal based on the vibration signal; filtering, through filtering, the target audio signal from the user speech signal captured by the sensor to obtain a to-be-filtered signal; and filtering the to-be-filtered signal from the user speech signal captured by the sensor to obtain the target speech information.

Specifically, the corresponding target audio signal may be restored based on the vibration signal, and the target audio signal is filtered from the speech signal through filtering to obtain a noise signal. After filtering, a filtered signal z'(n) no longer includes a wanted signal x'(n), and is basically external noise with the target audio signal s(n) of the user filtered. Optionally, if a plurality of cameras (a DVS, a high-speed camera, and the like) pick up vibrations of a person, target audio signals $x1'(n)$, $x2'(n)$, $x3'(n)$, and $x4'(n)$ restored from the vibrations are filtered from a mixed audio signal $z(n)$ in sequence by using the foregoing adaptive filtering method. In other words, the mixed audio signal $z'(n)$ in which various audio components $x1'(n)$, $x2'(n)$, $x3'(n)$, and $x4'(n)$ are removed is obtained.

In an optional implementation, the method further includes: obtaining, based on the target speech information, instruction information corresponding to the user speech signal, where the instruction information indicates semantic intent included in the user speech signal. The instruction information may be used to trigger an implementation of a function corresponding to the semantic intent included in the user speech signal, for example, starting an application program, making a voice call, or the like.

In an optional implementation, the obtaining the target speech information based on the vibration signal and the user speech signal captured by the sensor includes:
  obtaining, based on the vibration signal and the user speech signal captured by the sensor, the target speech information by using a cyclic neural network model; or
  obtaining a corresponding target audio signal based on the vibration signal, and obtaining, based on the target audio signal and the user speech signal captured by the sensor, the target speech information by using a cyclic neural network model.

In an optional implementation, the method further includes:
  obtaining a corresponding brain wave signal of the user when the user generates the speech; and
  correspondingly, the obtaining the target speech information based on the vibration signal and the user speech signal captured by the sensor includes:
  obtaining the target speech information based on the vibration signal, the brain wave signal, and the user speech signal captured by the sensor.

In an optional implementation, the method further includes:
  obtaining, based on the brain wave signal, a motion signal of a vocal tract occlusion part when the user generates the speech; and correspondingly, the obtaining the target speech information based on the vibration signal, the brain wave signal, and the user speech signal captured by the sensor includes:
  obtaining the target speech information based on the vibration signal, the motion signal, and the user speech signal captured by the sensor.

In an optional implementation, the obtaining the target speech information based on the vibration signal, the brain wave signal, and the user speech signal captured by the sensor includes:
  obtaining, based on the vibration signal, the brain wave signal, and the user speech signal captured by the sensor, the target speech information by using a cyclic neural network model; or
  obtaining a corresponding first target audio signal based on the vibration signal; and
  obtaining a corresponding second target audio signal based on the brain wave signal, and obtaining, based on the first target audio signal, the second target audio signal, and the user speech signal captured by the sensor, the target speech information by using a cyclic neural network model.

In an optional implementation, the target speech information includes a voiceprint feature indicating the user speech signal.

According to a second aspect, this application provides a speech signal processing method, where the method includes:
  obtaining a user speech signal captured by a sensor;
  obtaining a corresponding brain wave signal of a user when the user generates a speech; and
  obtaining target speech information based on the brain wave signal and the user speech signal captured by the sensor.

In an optional implementation, the method further includes:
  obtaining, based on the brain wave signal, a motion signal of a vocal tract occlusion part when the user utters a voice; and correspondingly, the obtaining target speech information based on the brain wave signal and the user speech signal captured by the sensor includes:
  obtaining the target speech information based on the motion signal and the user speech signal captured by the sensor.

In an optional implementation, the obtaining target speech information based on the brain wave signal and the user speech signal captured by the sensor includes:
  obtaining a corresponding target audio signal based on the brain wave signal;
  filtering, through filtering, the target audio signal from the user speech signal captured by the sensor to obtain a to-be-filtered signal; and
  filtering the to-be-filtered signal from the user speech signal captured by the sensor to obtain the target speech information.

In an optional implementation, the method further includes:
  obtaining, based on the target speech information, instruction information corresponding to the user speech signal, where the instruction information indicates semantic intent included in the user speech signal.

In an optional implementation, the obtaining target speech information based on the brain wave signal and the user speech signal captured by the sensor includes:
  obtaining, based on the brain wave signal and the user speech signal captured by the sensor, the target speech information by using a cyclic neural network model; or
  obtaining a corresponding target audio signal based on the brain wave signal, and obtaining, based on the target audio signal and the user speech signal captured by the sensor, the target speech information by using a cyclic neural network model.

In an optional implementation, the target speech information includes a voiceprint feature indicating the user speech signal.

According to a third aspect, this application provides a speech signal processing method, where the method includes:
  obtaining a user speech signal captured by a sensor;
  obtaining a corresponding vibration signal when a user generates a speech, where the vibration signal indicates a vibration feature of a body part of the user, and the body part is a part that vibrates correspondingly based on sound-making behavior when the user is making a sound; and
  performing voiceprint recognition based on the user speech signal captured by the sensor and the vibration signal.

In an optional implementation, the vibration signal indicates a vibration feature corresponding to a vibration generated by generating the speech.

In an optional implementation, the performing voiceprint recognition based on the user speech signal captured by the sensor and the vibration signal includes:

performing voiceprint recognition based on the user speech signal captured by the sensor to obtain a first confidence level that is of the user speech signal captured by the sensor and that belongs to the user;

performing voiceprint recognition based on the vibration signal to obtain a second confidence level that is of the user speech signal captured by the sensor and that belongs to the target user; and obtaining a voiceprint recognition result based on the first confidence level and the second confidence level.

In an optional implementation, the method further includes:

obtaining a corresponding brain wave signal of the user when the user generates the speech; and correspondingly, the performing voiceprint recognition based on the user speech signal captured by the sensor and the vibration signal includes:

performing voiceprint recognition based on the user speech signal captured by the sensor, the vibration signal, and the brain wave signal.

In an optional implementation, the performing voiceprint recognition based on the user speech signal captured by the sensor, the vibration signal, and the brain wave signal includes:

performing voiceprint recognition based on the user speech signal captured by the sensor to obtain the first confidence level that is of the user speech signal captured by the sensor and that belongs to the user;

performing voiceprint recognition based on the vibration signal to obtain the second confidence level that is of the user speech signal captured by the sensor and that belongs to the user;

performing voiceprint recognition based on the brain wave signal to obtain a third confidence level that is of the user speech signal captured by the sensor and that belongs to the user; and obtaining the voiceprint recognition result based on the first confidence level, the second confidence level, and the third confidence level.

According to a fourth aspect, this application provides a speech signal processing apparatus, where the apparatus includes:

an ambient speech obtaining module, configured to obtain a user speech signal captured by a sensor;

a vibration signal obtaining module, configured to obtain a corresponding vibration signal when a user generates a speech, where the vibration signal indicates a vibration feature of a body part of the user, and the body part is a part that vibrates correspondingly based on sound-making behavior when the user is making a sound; and a speech information obtaining module, configured to obtain target speech information based on the vibration signal and the user speech signal captured by the sensor.

In an optional implementation, the vibration signal indicates a vibration feature corresponding to a vibration generated when the user generates the speech.

In an optional implementation, the body part includes at least one of the following: a calvarium, a face, a larynx, or a neck.

In an optional implementation, the vibration signal obtaining module is configured to: obtain a video frame including the user; and extract, based on the video frame, the corresponding vibration signal when the user generates the speech.

In an optional implementation, the video frame is captured by using a dynamic vision sensor and/or a high-speed camera.

In an optional implementation, the speech information obtaining module is configured to: obtain a corresponding target audio signal based on the vibration signal; filter, through filtering, the target audio signal from the user speech signal captured by the sensor to obtain a to-be-filtered-out signal; and filter the to-be-filtered-out signal from the user speech signal captured by the sensor to obtain the target speech information.

In an optional implementation, the apparatus further includes:

an instruction information obtaining module, configured to obtain, based on the target speech information, instruction information corresponding to the user speech signal, where the instruction information indicates semantic intent included in the user speech signal.

In an optional implementation, the speech information obtaining module is configured to: obtain, based on the vibration signal and the user speech signal captured by the sensor, the target speech information by using a cyclic neural network model; or obtain a corresponding target audio signal based on the vibration signal, and obtain, based on the target audio signal and the user speech signal captured by the sensor, the target speech information by using a cyclic neural network model.

In an optional implementation, the apparatus further includes:

a brain wave signal obtaining module, configured to obtain a corresponding brain wave signal of the user when the user generates the speech, where correspondingly, the speech information obtaining module is configured to obtain the target speech information based on the vibration signal, the brain wave signal, and the user speech signal captured by the sensor.

In an optional implementation, the apparatus further includes:

a motion signal obtaining module, configured to obtain, based on the brain wave signal, a motion signal of a vocal tract occlusion part when the user generates the speech, where correspondingly, the speech information obtaining module is configured to obtain the target speech information based on the vibration signal, the motion signal, and the user speech signal captured by the sensor.

In an optional implementation, the speech information obtaining module is configured to: obtain, based on the vibration signal, the brain wave signal, and the user speech signal captured by the sensor, the target speech information by using a cyclic neural network model; or obtain a corresponding first target audio signal based on the vibration signal; and obtain a corresponding second target audio signal based on the brain wave signal, and obtain, based on the first target audio signal, the second target audio signal, and the user speech signal captured by the sensor, the target speech information by using a cyclic neural network model.

In an optional implementation, the target speech information includes a voiceprint feature indicating the user speech signal.

According to a fifth aspect, this application provides a speech signal processing apparatus, where the apparatus includes:

an ambient speech obtaining module, configured to obtain a user speech signal captured by a sensor;

a brain wave signal obtaining module, configured to obtain a corresponding brain wave signal of a user when the user generates a speech; and a speech information obtaining module, configured to obtain target speech information based on the brain wave signal and the user speech signal captured by the sensor.

In an optional implementation, the apparatus further includes:

a motion signal obtaining module, configured to obtain, based on the brain wave signal, a motion signal of a vocal tract occlusion part when the user utters a voice, where correspondingly, the speech information obtaining module is configured to obtain the target speech information based on the motion signal and the user speech signal captured by the sensor.

In an optional implementation, the speech information obtaining module is configured to: obtain a corresponding target audio signal based on the brain wave signal;

filter, through filtering, the target audio signal from the user speech signal captured by the sensor to obtain a to-be-filtered signal; and filter the to-be-filtered signal from the user speech signal captured by the sensor to obtain the target speech information.

In an optional implementation, the apparatus further includes:

an instruction information obtaining module, configured to obtain, based on the target speech information, instruction information corresponding to the user speech signal, where the instruction information indicates semantic intent included in the user speech signal.

In an optional implementation, the speech information obtaining module is configured to: obtain, based on the brain wave signal and the user speech signal captured by the sensor, the target speech information by using a cyclic neural network model; or obtain a corresponding target audio signal based on the brain wave signal, and obtain, based on the target audio signal and the user speech signal captured by the sensor, the target speech information by using a cyclic neural network model.

In an optional implementation, the target speech information includes a voiceprint feature indicating the user speech signal.

According to a sixth aspect, this application provides a speech signal processing apparatus, where the apparatus includes:

an ambient speech obtaining module, configured to obtain a user speech signal captured by a sensor;

a vibration signal obtaining module, configured to obtain a corresponding vibration signal when a user generates a speech, where the vibration signal indicates a vibration feature of a body part of the user, and the body part is a part that vibrates correspondingly based on sound-making behavior when the user is making a sound; and a voiceprint recognition module, configured to perform voiceprint recognition based on the user speech signal captured by the sensor and the vibration signal.

In an optional implementation, the vibration signal indicates a vibration feature corresponding to a vibration generated by generating the speech.

In an optional implementation, the voiceprint recognition module is configured to: perform voiceprint recognition based on the user speech signal captured by the sensor to obtain a first confidence level that is of the user speech signal captured by the sensor and that belongs to the user;

perform voiceprint recognition based on the vibration signal to obtain a second confidence level that is of the user speech signal captured by the sensor and that belongs to the target user; and obtain a voiceprint recognition result based on the first confidence level and the second confidence level.

In an optional implementation, the apparatus further includes:

a brain wave signal obtaining module, configured to obtain a corresponding brain wave signal of the user when the user generates the speech, where correspondingly, the voiceprint recognition module is configured to perform voiceprint recognition based on the user speech signal captured by the sensor, the vibration signal, and the brain wave signal.

In an optional implementation, the voiceprint recognition module is configured to: perform voiceprint recognition based on the user speech signal captured by the sensor to obtain the first confidence level that is of the user speech signal captured by the sensor and that belongs to the user;

perform voiceprint recognition based on the vibration signal to obtain the second confidence level that is of the user speech signal captured by the sensor and that belongs to the user;

perform voiceprint recognition based on the brain wave signal to obtain a third confidence level that is of the user speech signal captured by the sensor and that belongs to the user; and obtain the voiceprint recognition result based on the first confidence level, the second confidence level, and the third confidence level.

According to a seventh aspect, this application provides an autonomous driving vehicle, where the autonomous driving vehicle may include a processor, the processor is coupled to a memory, the memory stores program instructions, and when the program instructions stored in the memory are executed by the processor, the method according to the first aspect is implemented. For steps performed by the processor by the autonomous driving vehicle in the possible implementations of the first aspect, refer to the first aspect for details. Details are not described herein again.

According to an eighth aspect, this application provides a computer-readable storage medium, where the computer-readable storage medium stores a computer program, and when the computer program runs on a computer, the computer performs the method according to the first aspect.

According to a ninth aspect, this application provides a circuit system, where the circuit system includes a processing circuit, and the processing circuit is configured to perform the method according to the first aspect.

According to a tenth aspect, this application provides a computer program, where when the computer program runs on a computer, the computer performs the method according to the first aspect.

According to an eleventh aspect, this application provides a chip system, where the chip system includes a processor, configured to support a server or a threshold obtaining apparatus in implementing functions in the foregoing aspects, for example, sending or processing data and/or information in the foregoing methods. In a possible design, the chip system further includes a memory, and the memory is configured to store program instructions and data that are necessary for the server or a communication device. The chip system may include a chip, or may include a chip and another discrete device.

The embodiment of this application provides the speech signal processing method, including: obtaining the user speech signal captured by the sensor, where the speech signal includes the ambient noise; obtaining the corresponding vibration signal when the user generates the speech, where the vibration signal indicates the vibration feature of the body part of the user, and the body part is the part that vibrates correspondingly based on the sound-making behavior when the user is making a sound; and obtaining the target speech information based on the vibration signal and the user speech signal captured by the sensor. In the foregoing manner, the vibration signal is used as the basis for the speech recognition. Because the vibration signal does not include the external non-user speech mixed during complex acoustic transmission, and is slightly affected by the other ambient noise (for example, affected by the reverberation), this part of noise interference can be well suppressed, and good speech recognition effect can be achieved.

DESCRIPTION OF EMBODIMENTS

Figure 1A:
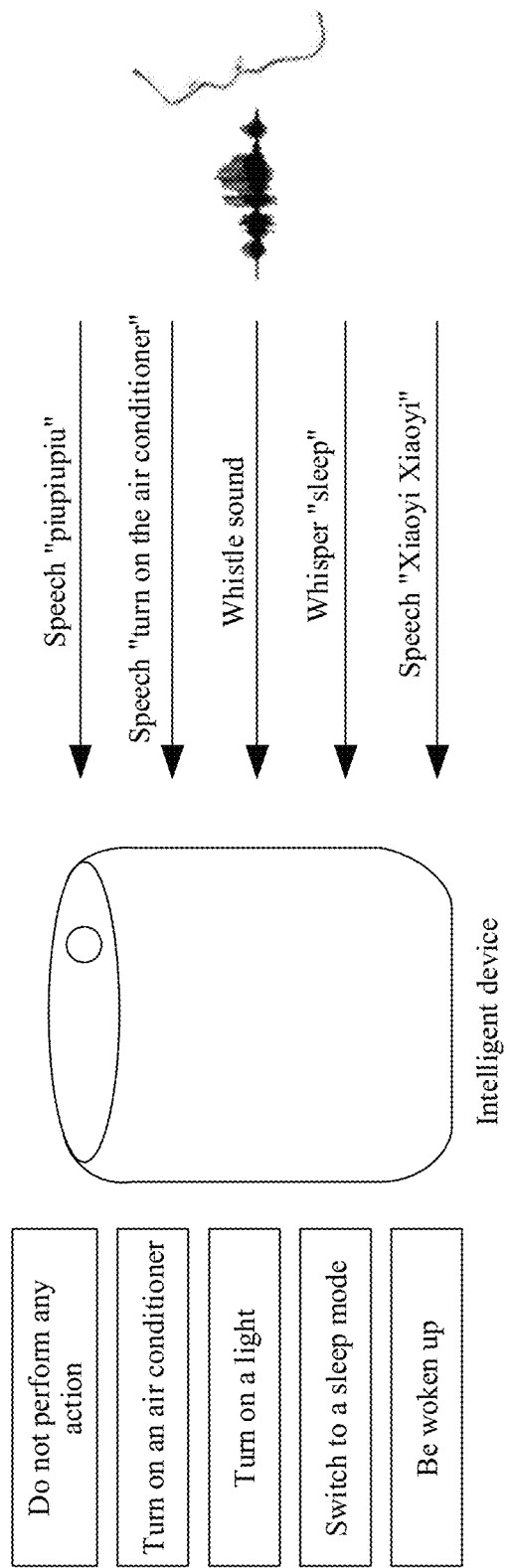
FIG. 1a is a schematic diagram of an intelligent device.

The following describes embodiments of this application with reference to the accompanying drawings in embodiments of this application.

In the specification, the claims, and the accompanying drawings of this application, the terms "first", "second", "third", "fourth", and the like are intended to distinguish between different objects but do not indicate a particular order. In addition, the terms "including", "having", and any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

"Embodiment" mentioned in this specification means that a particular characteristic, structure, or feature described with reference to embodiments may be included in at least one embodiment of this application. The phrase appear at various locations in this specification may neither necessarily mean a same embodiment, nor mean an independent or optional embodiment exclusive from another embodiment. A person skilled in the art understands, in explicit and implicit manners, that an embodiment described in this application may be combined with another embodiment.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both of a computing device and an application that runs on the computing device may be components. One or more components may reside within a process and/or a thread of execution, and a component may be located on one computer and/or distributed between two or more computers. In addition, the components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

The following describes technical solutions of this application with reference to accompanying drawings.

A speech signal processing method provided in embodiments of this application can be applied to scenarios such as human-computer interaction related to speech recognition and voiceprint recognition. Specifically, the speech signal processing method in embodiments of this application can be applied to the speech recognition and the voiceprint recognition. The following separately briefly describes a speech recognition scenario and a voiceprint recognition scenario.

Scenario 1: Human-Computer Interaction Based on Speech Recognition.

Speech recognition (automatic speech recognition, ASR) is also referred to as automatic speech recognition. In an implementation, the automatic speech recognition aims to convert vocabulary content, such as keys, binary code, or character sequences, in human speech into a computer-readable input.

In a scenario, this application may be applied to an apparatus having a speech interaction function. In this embodiment, "having a speech interaction function" may be a function that can be implemented on the apparatus, and the apparatus may recognize a speech of a user, and trigger a corresponding function based on the speech, to further implement speech interaction with the user. The apparatus having a speech interaction function may be an intelligent device such as a sound box, an alarm clock, a watch, or a robot, or a vehicle-mounted device, or a portable device such as a mobile phone, a tablet computer, an AR augmented reality device, or a VR virtual reality device.

In an embodiment of this application, the apparatus having a speech interaction function may include an audio sensor and a video sensor. The audio sensor may capture an audio signal in an environment, and the video sensor may capture video in a specific area. The audio signal may include an audio signal generated when one or more users utter a voice and another noise signal in the environment. The video may include the one or more users who utter the voice. Further, an audio signal generated when the one or more users utter the voice may be extracted based on the audio signal and the video. Further, the speech interaction function with the user may be implemented based on the extracted audio signal. How to extract, based on the audio signal and the video, the audio signal generated when the one or more users utter the voice is described in detail in a subsequent embodiment. Details are not described herein again.

In an embodiment of this application, the audio sensor and the video sensor may not be used as components of the apparatus having a speech interaction function, but may be used as independent components or components integrated into another apparatus. In this case, the apparatus having a speech interaction function may obtain only an audio signal in an environment captured by the audio sensor or obtain only video in a specific area captured by the video sensor, and further extract, based on the audio signal and the video, an audio signal generated when one or more users utter a voice. Further, the speech interaction function with the user may be implemented based on the extracted audio signal.

Further, the audio sensor is used as a component of the apparatus having a speech interaction function, and the video sensor is not used as a component of the apparatus having a speech interaction function. Alternatively, the audio sensor is not used as a component of the apparatus having a speech interaction function, and the video sensor is not used as a component of the apparatus having a speech interaction function. Alternatively, the audio sensor is not used as a component of the apparatus having a speech interaction function, but the video sensor is used as a component of the apparatus having a speech interaction function.

For example, the apparatus having a speech interaction function may be an intelligent device shown in FIG. 1a. As shown in FIG. 1a, if recognizing a speech "piupiupiu", the intelligent device does not perform any action. For example, if recognizing a speech "turn on the air conditioner", the intelligent device performs an action corresponding to the speech "turn on the air conditioner": turning on an air conditioner. For example, if recognizing a sound made by the user by blowing a whistle, that is, a whistle sound, the intelligent device performs an action corresponding to the whistle sound: turning on a light. For example, if recognizing a speech "turn on the light", the intelligent device does not perform any action. For example, if recognizing a speech "sleep" in a whisper mode, the intelligent device performs an action corresponding to the speech "sleep" in the whisper mode: switching to a sleep mode. The speech "piupiupiu", the whistle sound, the speech "sleep" in the whisper mode, and the like are special speeches. Speeches such as "turn on the air conditioner" and "turn on the light" are normal speeches. The normal speech is a type of speech in which semantics can be recognized and a vocal cord vibrates when a sound is made. The special speech is a type of speech that is different from a normal speech. For example, the special speech is a type of speech in which a vocal cord does not vibrate when a sound is made, that is, an unvoiced speech. For another example, the special speech is a speech without semantics.

Figure 1B:
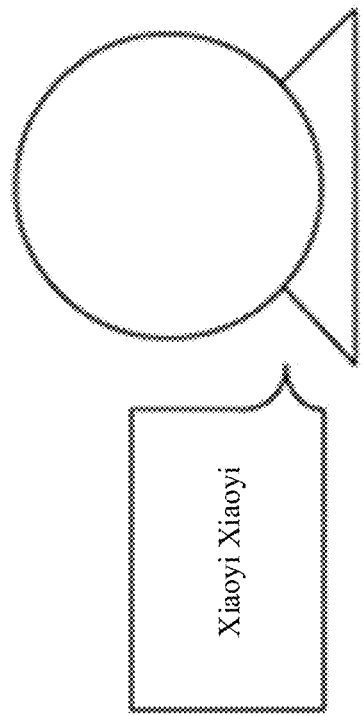
FIG. 1b(a) and FIG. 1b(b) are a schematic diagram of a graphical user interface of a mobile phone according to an embodiment of this application.
Figure 1B:
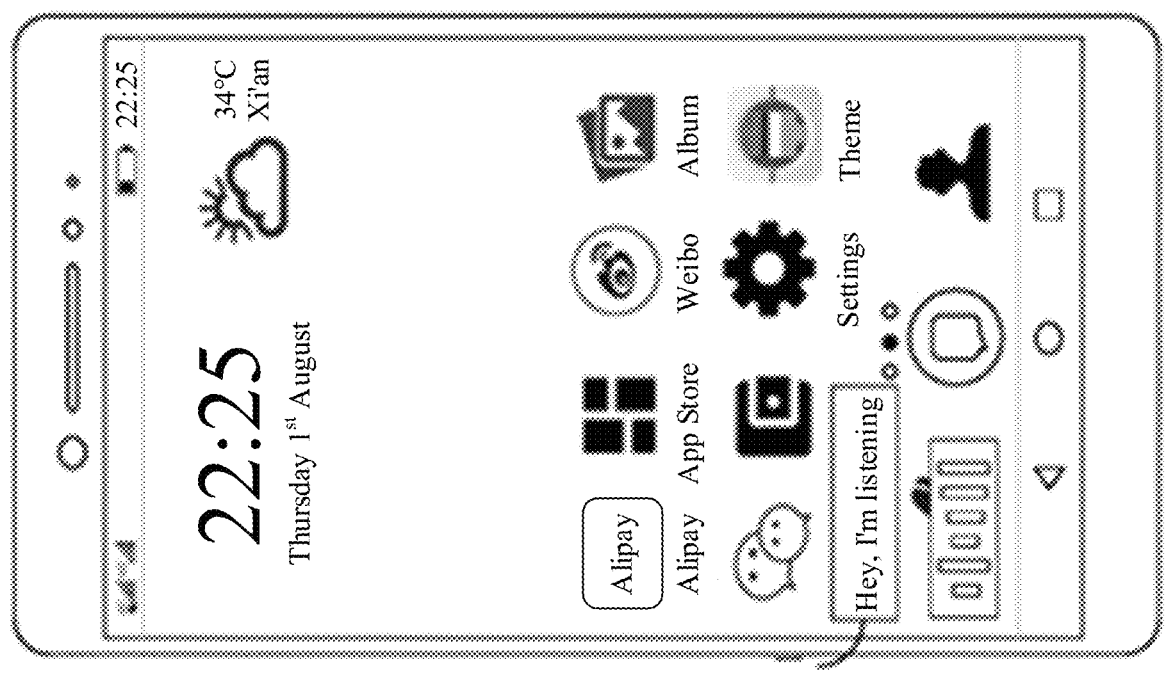
Figure 1B:
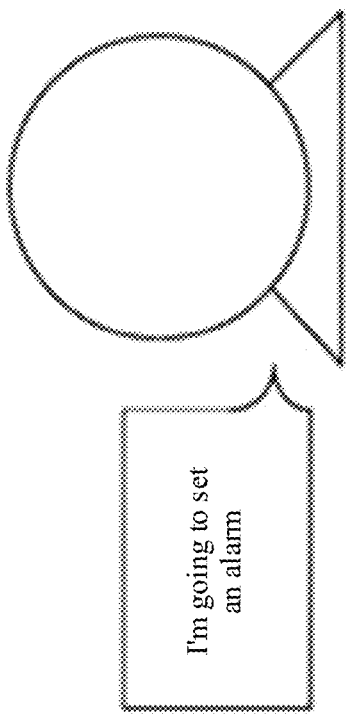
Figure 1B:
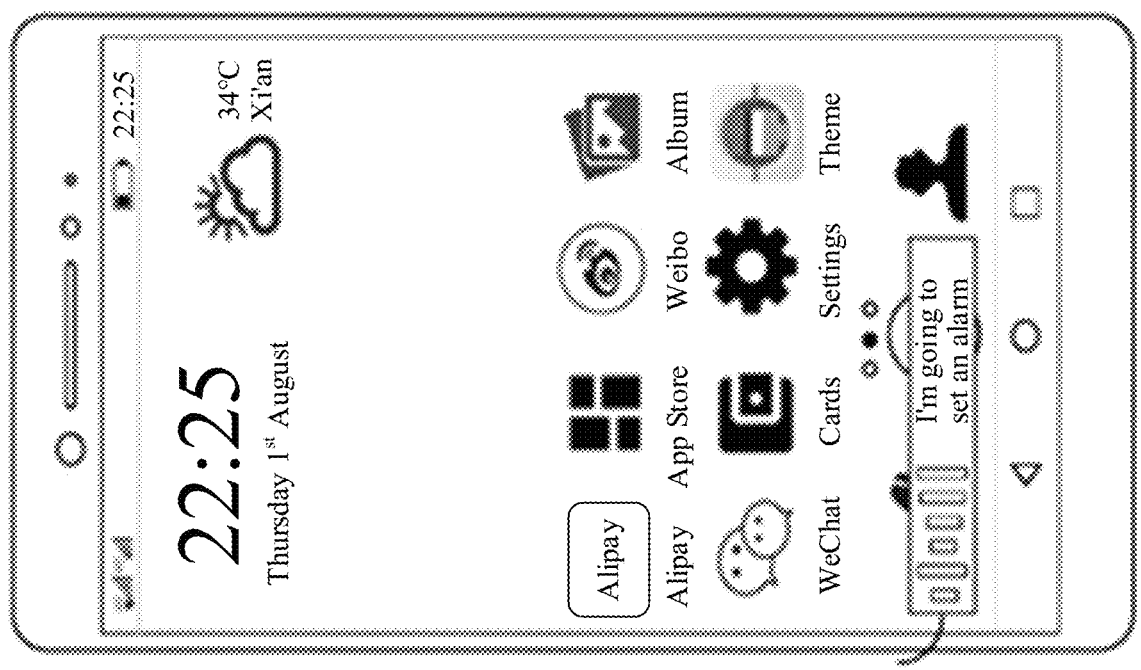

For example, the apparatus having a speech interaction function may be an apparatus having a display function, for example, may be a mobile phone. FIG. 1b(a) and FIG. 1b(b) show a graphical user interface (GUI) of a mobile phone according to an embodiment of this application. As shown in FIG. 1b(a) and FIG. 1b(b), the GUI is a display interface when the mobile phone interacts with a user. After the mobile phone detects a speech wakeup phrase "Xiaoyi Xiaoyi" of the user, the mobile phone may display a text display window 101 of a voice assistant on a desktop, and the mobile phone may remind, through the window 101, the user of "Hi, I am listening". It should be understood that, when displaying text through the window 101 or a window 102 to remind the user, the mobile phone may also play "Hi, I am listening" to the user through voice broadcasting.

In some scenarios, the apparatus having a speech interaction function may be a system including a plurality of apparatuses.

Figure 2:
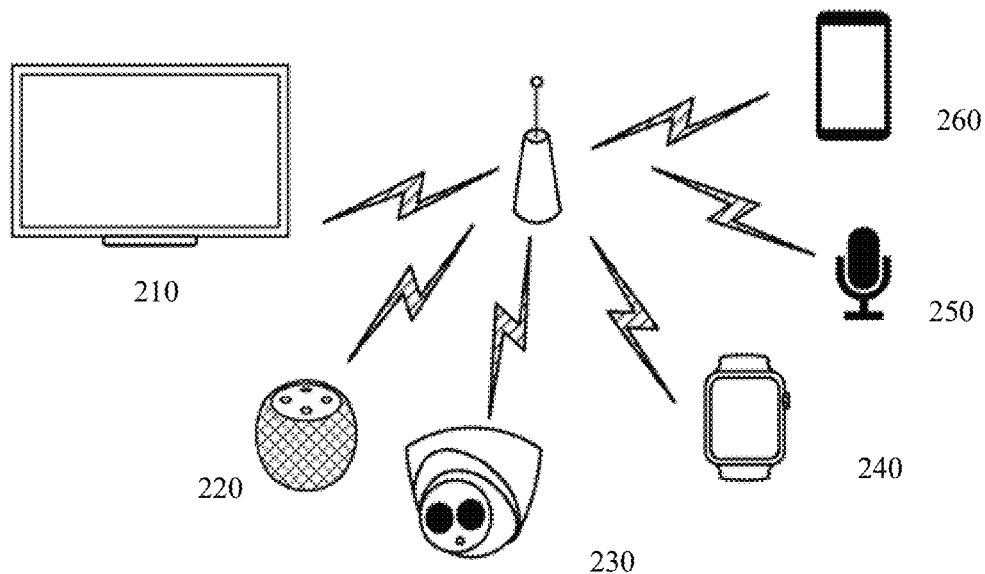
FIG. 2 is a schematic diagram of an application scenario according to an embodiment of this application.

FIG. 2 shows an application scenario according to an embodiment of this application. The application scenario in FIG. 2 may also be referred to as a smart household scenario. The application scenario in FIG. 2 may include at least one electronic device (for example, an electronic device 210, an electronic device 220, an electronic device 230, an electronic device 240, and an electronic device 250), an electronic device 260, and an electronic device. The electronic device 210 in FIG. 2 may be a television. The electronic device 220 may be a sound box. The electronic device 230 may be a monitor device. The electronic device 240 may be a watch. The electronic device 250 may be a smart microphone. The electronic device 260 may be a mobile phone or a tablet computer. The electronic device may be a wireless communication device, for example, a router, a gateway device, or the like. The electronic device 210, the electronic device 220, the electronic device 230, the electronic device 240, the electronic device 250, and the electronic device 260 in FIG. 2 may perform uplink transmission and downlink transmission with the electronic device according to a wireless communication protocol. For example, the electronic device may send information to the electronic device 210, the electronic device 220, the electronic device 230, the electronic device 240, the electronic device 250, and the electronic device 260, and may receive information sent by the electronic device 210, the electronic device 220, the electronic device 230, the electronic device 240, the electronic device 250, and the electronic device 260.

It should be noted that this embodiment of this application may be applied to an application scenario including one or more wireless communication devices and a plurality of electronic devices. This is not limited in this application.

In this embodiment of this application, the apparatus having a speech interaction function may be any electronic device in the smart household system, for example, may be the television, the sound box, the watch, the smart microphone, the mobile phone or the tablet computer, or the like. Any electronic device in the smart household system may include an audio sensor or a video sensor. After obtaining audio information or video in an environment, the electronic device may transmit, by using the wireless communication device, the audio information or the video to the apparatus having a speech interaction function, or transmit the audio information or the video to a server on a cloud side (not shown in FIG. 2). The apparatus having a speech interaction function may extract, based on the audio information and the video, an audio signal generated when one or more users utter a voice. In this way, a speech interaction function with the user may be implemented based on the extracted audio signal. Alternatively, the server on the cloud side may extract, based on the audio information and the video, an audio signal generated when one or more users utter a voice, and transmit the extracted audio signal to the apparatus having a speech interaction function. Further, the apparatus having a speech interaction function may implement a speech interaction function with the user based on the extracted audio signal.

In an example, the application scenario includes the electronic device 210, the electronic device 260, and the electronic device. The electronic device 210 is the television, the electronic device 260 is the mobile phone, and the electronic device is the router. The router is configured to implement wireless communication between the television and the mobile phone. The apparatus having a speech interaction function may be the mobile phone. The video sensor may be disposed on the television, and the audio sensor may be disposed on the mobile phone. After obtaining video, the television may transmit the video to the mobile phone. The mobile phone may extract, based on audio information and the video, an audio signal generated when one or more users utter a voice. Further, a speech interaction function with the user may be implemented based on the extracted audio signal.

In an example, the application scenario includes the electronic device 220, the electronic device 260, and the electronic device. The electronic device 220 is the sound box, the electronic device 260 is the mobile phone, and the electronic device is the router. The router is configured to implement wireless communication between the sound box and the mobile phone. The apparatus having a speech interaction function may be the mobile phone. The video sensor may be disposed on the mobile phone, and the audio sensor may be disposed on the sound box. After obtaining audio information, the sound box may transmit the audio information to the mobile phone. The mobile phone may extract, based on the audio information and video, an audio signal generated when one or more users utter a voice. Further, a speech interaction function with the user may be implemented based on the extracted audio signal.

In an example, the application scenario includes the electronic device 230, the electronic device 260, and the electronic device. The electronic device 230 is the monitor device, the electronic device 260 is the mobile phone, and the electronic device is the router. The router is configured to implement wireless communication between the monitor device and the mobile phone. The apparatus having a speech interaction function may be the mobile phone. The video sensor may be disposed on the monitor device, and the audio sensor may be disposed on the mobile phone. After obtaining video, the monitor device may transmit the video to the mobile phone. The mobile phone may extract, based on audio information and the video, an audio signal generated when one or more users utter a voice. Further, a speech interaction function with the user may be implemented based on the extracted audio signal.

In an example, the application scenario includes the electronic device 250, the electronic device 260, and the electronic device. The electronic device 250 is the microphone, the electronic device 260 is the mobile phone, and the electronic device is the router. The router is configured to implement wireless communication between the microphone and the mobile phone. The apparatus having a speech interaction function may be the microphone. The video sensor may be disposed on the mobile phone, and the audio sensor may be disposed on the microphone. After obtaining video, the mobile phone may transmit the video to the microphone. The microphone may extract, based on audio information and the video, an audio signal generated when one or more users utter a voice. Further, a speech interaction function with the user may be implemented based on the extracted audio signal.

It should be noted that the foregoing description of the product form is merely an example. In an actual application, deployment forms of the video sensor and the audio sensor may be flexibly set.

Figure 3:
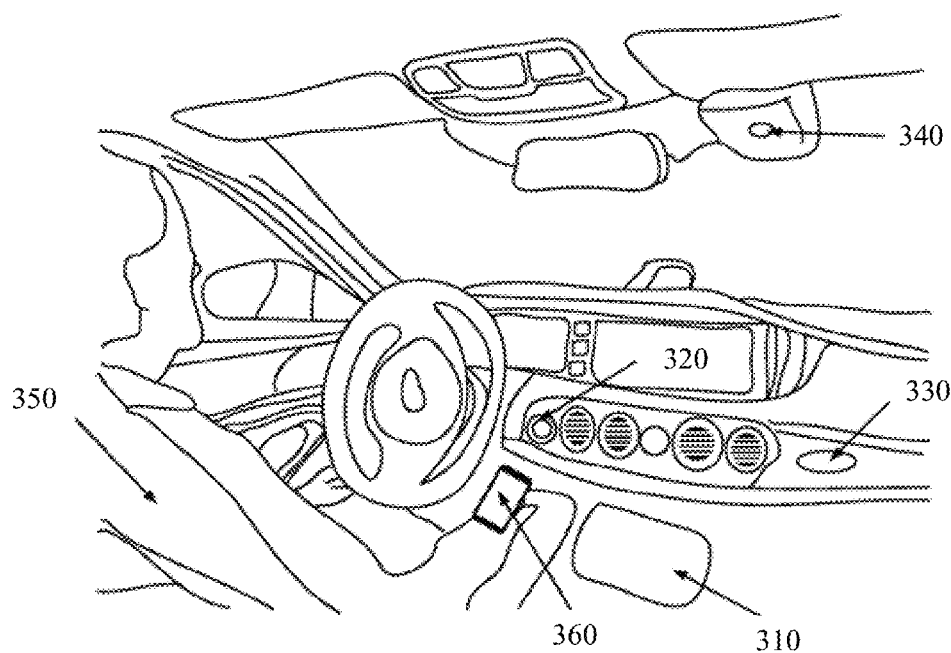
FIG. 3 and FIG. 4 are schematic diagrams of another application scenario according to an embodiment of this application.
Figure 4:
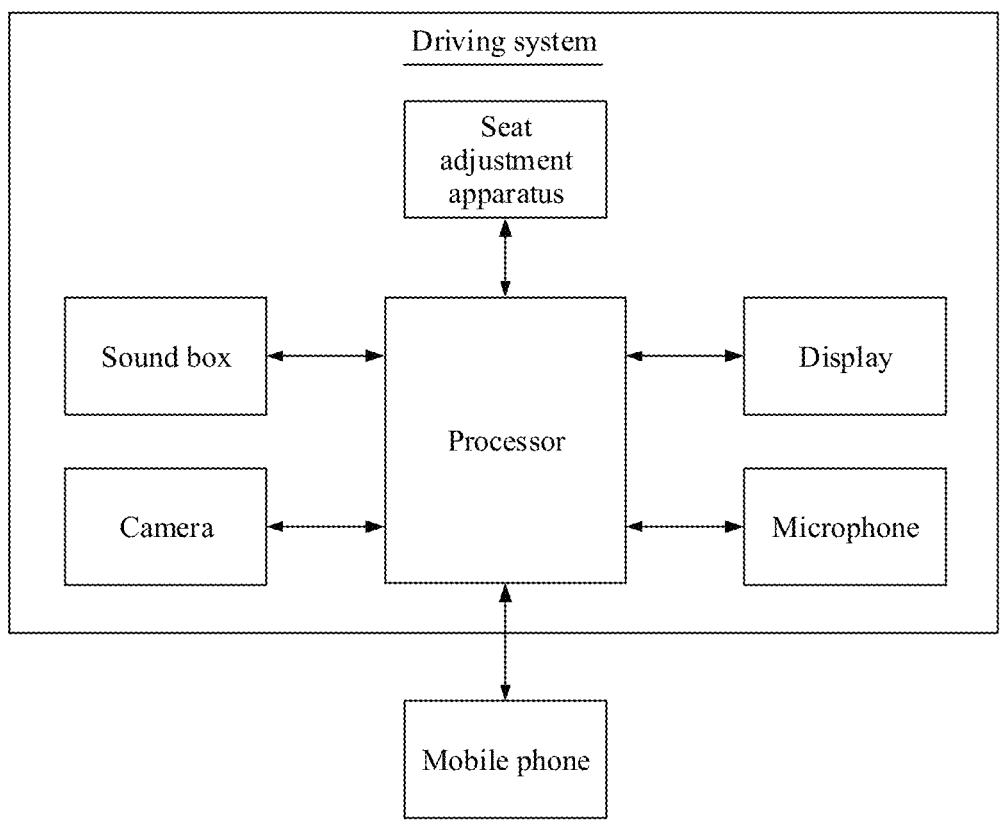

FIG. 3 and FIG. 4 show another application scenario according to an embodiment of this application. The application scenario in FIG. 3 and FIG. 4 may also be referred to as a smart driving scenario. The application scenario in FIG. 3 and FIG. 4 may include an electronic device, including an apparatus 310, an apparatus 320, an apparatus 330, an apparatus 340, and an apparatus 350. The electronic device may be a driving system (which may also be referred to as a vehicle-mounted system). The apparatus 310 may be a display. The apparatus 320 may be a microphone. The apparatus 330 may be a sound box. The apparatus 340 may be a camera. The apparatus 350 may be a seat adjustment apparatus. The electronic device 360 may be a mobile phone or a tablet computer. The electronic device may receive data sent by the apparatus 310, the apparatus 320, the apparatus 330, the apparatus 340, and the apparatus 350. In addition, the electronic device and the electronic device 360 may communicate with each other according to a wireless communication protocol. For example, the electronic device may send a signal to the electronic device 360, or may receive a signal sent by the electronic device 360.

It should be noted that this embodiment of this application may be applied to an application scenario including a driving system and a plurality of electronic devices. This is not limited in this application.

In an example, the application scenario includes the apparatus 320, the apparatus 330, the electronic device 360, and the electronic device (the driving system). The apparatus 320 is the microphone, the apparatus 340 is the camera, the electronic device 360 is the tablet computer, and the electronic device is the driving system. The driving system is configured to perform wireless communication with the mobile phone, and is further configured to drive the microphone to capture an audio signal, and drive the camera to capture video. The driving system may drive the microphone to capture the audio signal, and send the audio signal captured by the microphone to the tablet computer. The driving system may drive the camera to capture the video, and send the video captured by the camera to the tablet computer. The tablet computer may extract, based on audio information and the video, an audio signal generated when one or more users utter a voice. Further, a speech interaction function with the user may be implemented based on the extracted audio signal.

It should be noted that, in the smart driving scenario, the video sensor may be independently deployed, for example, disposed at a preset location in a vehicle. In this way, the video sensor can capture video in a preset area. For example, the video sensor may be disposed on a windshield or a seat, to capture video of a user on a seat.

In an embodiment of this application, an apparatus having a speech recognition function may be a head-mounted portable device, for example, may be an/a AR/VR device. An audio sensor and a brain wave capturing device may be disposed on the head-mounted portable device. The audio sensor may capture an audio signal, the brain wave capturing device may capture a brain wave signal, and then the head-mounted portable device may extract, based on the audio signal and the brain wave signal, an audio signal generated when one or more users utter a voice. Further, a speech interaction function with the user may be implemented based on the extracted audio signal.

It should be noted that the audio sensor and the brain wave capturing device may not be used as components of the apparatus having a speech interaction function, but may be used as independent components or components integrated into another apparatus. In this case, the apparatus having a speech interaction function may obtain only an audio signal in an environment captured by the audio sensor or obtain only a brain wave signal in a specific area captured by the brain wave capturing device, and further extract, based on the audio signal and the brain wave signal, an audio signal generated when one or more users utter a voice. Further, a speech interaction function with the user may be implemented based on the extracted audio signal.

Further, the audio sensor is used as a component of the apparatus having a speech interaction function, and the brain wave capturing device is not used as a component of the apparatus having a speech interaction function. Alternatively, the audio sensor is not used as a component of the apparatus having a speech interaction function, and the brain wave capturing device is not used as a component of the apparatus having a speech interaction function. Alternatively, the audio sensor is not used as a component of the apparatus having a speech interaction function, but the brain wave capturing device is used as a component of the apparatus having a speech interaction function.

It may be understood that the application scenarios in FIG. 1a to FIG. 4 are merely example implementations in embodiments of this application, and application scenarios in embodiments of this application include but are not limited to the foregoing application scenarios.

Scenario 2: Voiceprint Recognition

A voiceprint (voiceprint) is a sound wave spectrum that is displayed by an electrical acoustic instrument and that carries language information. The voiceprint is a biological feature that includes more than 100 feature dimensions such as a wavelength, a frequency, and intensity. Voiceprint recognition is a technology in which an unknown sound is recognized by analyzing features of one or more speech signals. Briefly, the voiceprint recognition is a technology used to recognize whether a sentence is spoken by a specific person. An identity of a speaker may be determined based on a voiceprint, and therefore a targeted answer can be provided.

In addition, this application may be further applied to an audio denoising scenario. The speech signal processing method in this application may be used in an audio input apparatus that needs to perform audio denoising, for example, an earphone or a microphone (an independent microphone or a microphone on a terminal device). A user may speak to the audio input apparatus. According to the speech signal processing method in this application, the audio input apparatus may extract, from the audio input including ambient noise, a speech signal sent by the user.

It should be understood that the examples herein are merely used to facilitate understanding of the application scenarios of embodiments of this application, and the application scenarios of embodiments of this application are not exhaustively enumerated. The following describes embodiments of this application with reference to the accompanying drawings. A person of ordinary skill in the art may learn that, with development of technologies and emergence of a new scenario, the technical solutions provided in embodiments of this application are also applicable to a similar technical problem.

The following describes an electronic device provided in embodiments of this application, a user interface for such an electronic device, and embodiments for using such an electronic device. In some embodiments, the electronic device may be a portable electronic device that further includes another function such as a personal digital assistant function and/or a music player function, for example, a mobile phone, a tablet computer, or a wearable electronic device (for example, a smartwatch or the like) having a wireless communication function. An example embodiment of the portable electronic device includes but is not limited to a portable electronic device using another operating system. The portable electronic device may alternatively be another portable electronic device, for example a laptop computer or the like. It should be further understood that, in some other embodiments, the electronic device may not be a portable electronic device, but may be such as a desktop computer, a television, a sound box, a monitor device, a camera, a display, a microphone, a seat adjustment apparatus, a fingerprint recognition apparatus, or a vehicle-mounted driving system.

Figure 5:
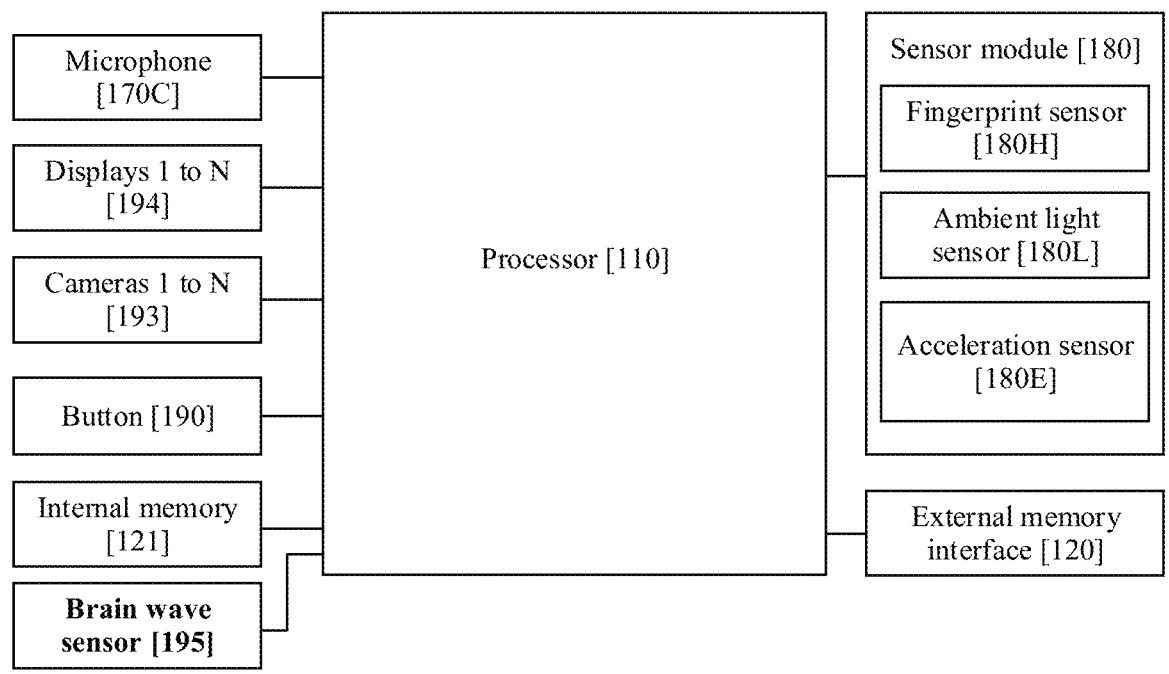
FIG. 5 is a schematic diagram of a structure of an electronic device.

For example, FIG. 5 is a schematic diagram of a structure of an electronic device 100. The electronic device 100 may include a processor 110, an external memory interface 120, an internal memory 121, a microphone 170C, a sensor module 180, a button 190, a camera 193, a display 194, a subscriber identification module (SIM) card interface, and the like.

It may be understood that an example structure in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors. In some embodiments, the electronic device 100 may also include one or more processors 110. The controller may generate an operation control signal based on instruction operation code and a time sequence signal, to complete control of instruction reading and instruction execution. In some other embodiments, a memory may be further disposed in the processor 110, to store instructions and data. For example, the memory in the processor 110 may be a cache memory. The memory may store instructions or data just used or cyclically used by the processor 110. If the processor 110 needs to use the instructions or the data again, the processor may directly invoke the instructions or the data from the memory. In this way, repeated access is avoided, waiting time of the processor 110 is reduced, and efficiency of processing data or executing instructions by the electronic device 100 is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB port, and/or the like. The USB port is a port that conforms to a USB standard specification, and may be specifically a mini USB port, a micro USB port, a USB type-C port, or the like. The USB port may be configured to connect to a charger to charge the electronic device 100, or may be configured to perform data transmission between the electronic device 100 and a peripheral device. The USB port may alternatively be configured to connect to a headset, and play audio by using the headset.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection mode different from that in the foregoing embodiment, or a combination of a plurality of interface connection modes.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or more displays 194.

The display 194 of the electronic device 100 may be a flexible screen. Currently, the flexible screen attracts much attention for unique features and huge potential of the flexible screen. Compared with a conventional screen, the flexible screen has features of strong flexibility and bendability, and can provide a user with a new interaction mode based on the feature of bendability, to meet more requirements of the user for an electronic device. For an electronic device configured with a foldable display, the foldable display on the electronic device may be switched between a small screen in a folded form and a large screen in an expanded form at any time. Therefore, the user uses a split-screen function more frequently on the electronic device provided with the foldable display.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or video. An optical image of an object is generated through a lens, and is projected to a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB, YUV, and the like. In some embodiments, the electronic device 100 may include one or more cameras 193.

The camera 193 in this embodiment of this application may be a high-speed camera or a dynamic vision sensor (DVS).

The digital signal processor is configured to process a digital signal, and may process another digital signal in addition to a digital image signal. For example, when the electronic device 100 selects a frequency, the digital signal processor is configured to perform Fourier transform and the like on frequency energy.

The video codec is configured to: compress or decompress digital video. The electronic device 100 may support one or more video codecs. In this way, the electronic device 100 may play back or record video in a plurality of coding formats, for example, moving picture experts group (moving picture experts group, MPEG)-1, MPEG-2, MPEG-3, MPEG-4, and the like.

The NPU is a neural-network (NN) computing processor, quickly processes input information by referring to a structure of a biological neural network, for example, by referring to a mode of transfer between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and video are stored in the external storage card.

The internal memory 121 may be configured to store one or more computer programs, and the one or more computer programs include instructions. The processor 110 may run the instructions stored in the internal memory 121, so that the electronic device 100 performs the speech signal processing method provided in some embodiments of this application, various applications, data processing, and the like. The internal memory 121 may include a program storage area and a data storage area. The program storage area may store an operating system. The program storage area may further store one or more applications (such as Gallery and Contacts), and the like. The data storage area may store data (for example, Photos and Contacts) created during the use of the electronic device 100, and the like. In addition, the internal memory 121 may include a high-speed random access memory, or may include a non-volatile memory, for example, one or more magnetic disk storage devices, a flash memory device, a universal flash storage (UFS), or the like. In some embodiments, the processor 110 may run the instructions stored in the internal memory 121 and/or the instructions stored in the memory that is disposed in the processor 110, to enable the electronic device 100 to perform the speech signal processing method provided in embodiments of this application, other applications, and data processing. The electronic device 100 can implement audio functions, for example, a music playing function and a recording function, by using an audio module, a speaker, a receiver, the microphone, a headset jack, the application processor, and the like.

The sensor module 180 may include an acceleration sensor 180E, a fingerprint sensor 180H, an ambient light sensor 180L, and the like.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to capture a fingerprint. The electronic device 100 may use a feature of the captured fingerprint to implement fingerprint-based unlocking, application lock access, fingerprint-based photographing, fingerprint-based call answering, and the like.

A brain wave sensor 195 may capture a brain wave signal.

The button 190 includes a power button, a volume button, and the like. The button 190 may be a mechanical button, or may be a touch button. The electronic device 100 may receive a key input, and generate a key signal input related to a user setting and function control of the electronic device 100.

Figure 6:
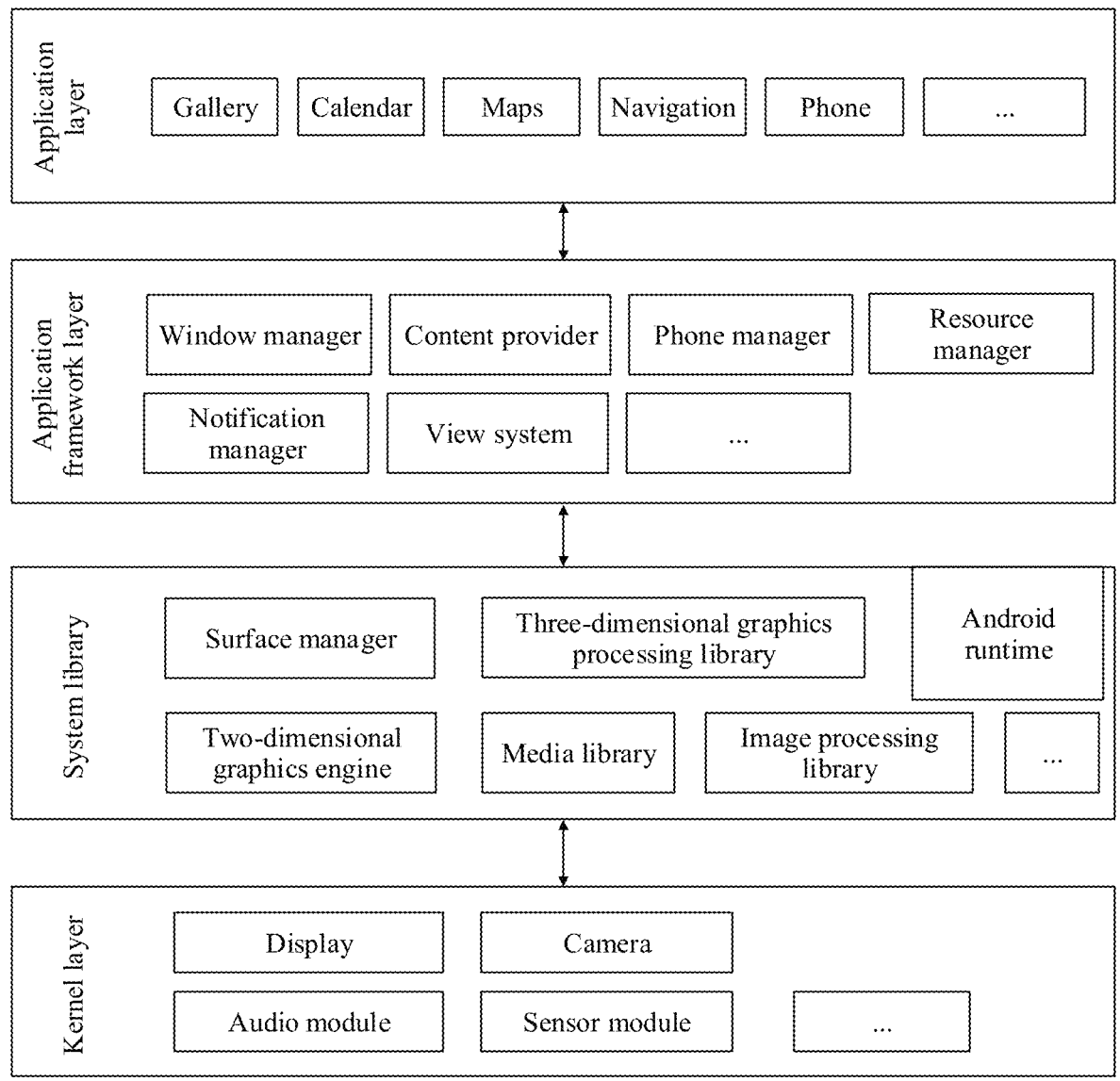
FIG. 6 is a schematic block diagram of a software structure of an electronic device according to an embodiment of this application.

FIG. 6 is a block diagram of a software structure of an electronic device 100 according to an embodiment of this application. In a layered architecture, software is divided into several layers, and each layer has a clear role and task. Layers communicate with each other through a software interface. In some embodiments, the Android system is divided into four layers: an application layer, an application framework layer, an Android runtime and system library, and a kernel layer from top to bottom. The application layer may include a series of application packages.

As shown in FIG. 6, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 6, the application program framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include video, an image, audio, calls that are made and answered, a browsing history, a bookmark, an address book, and the like.

The view system includes visual controls such as a control for displaying text and a control for displaying an image. The view system may be configured to construct an application. A display interface may include one or more views. For example, a display interface including a notification icon of Messages may include a text display view and an image display view.

The phone manager is configured to provide a communication function of the electronic device 100, for example, management of call statuses (including call connection and disconnection, and the like).

The resource manager provides various resources such as a localized character string, an icon, an image, a layout file, and a video file for an application.

The notification manager enables an application to display notification information in a status bar, and may be configured to convey a notification-type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application that is run on the background or a notification that appears on the screen in a form of a dialog window. For example, text information is displayed in the status bar, an announcement is given, the electronic device vibrates, an indicator light blinks, and the like.

The system library may include a plurality of function modules, for example, a surface manager, a media library, a three-dimensional graphics processing library (for example, OpenGL ES), a 2D graphics engine (for example, SGL), and the like.

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, for example, MPEG-4, H.264, MP3, AAC, AMR, JPG, PNG, and the like.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, an apparatus having structures shown in FIG. 5 and FIG. 6 is used as an example to describe in detail a speech signal processing method provided in embodiments of this application with reference to the accompanying drawings.

Figure 7:
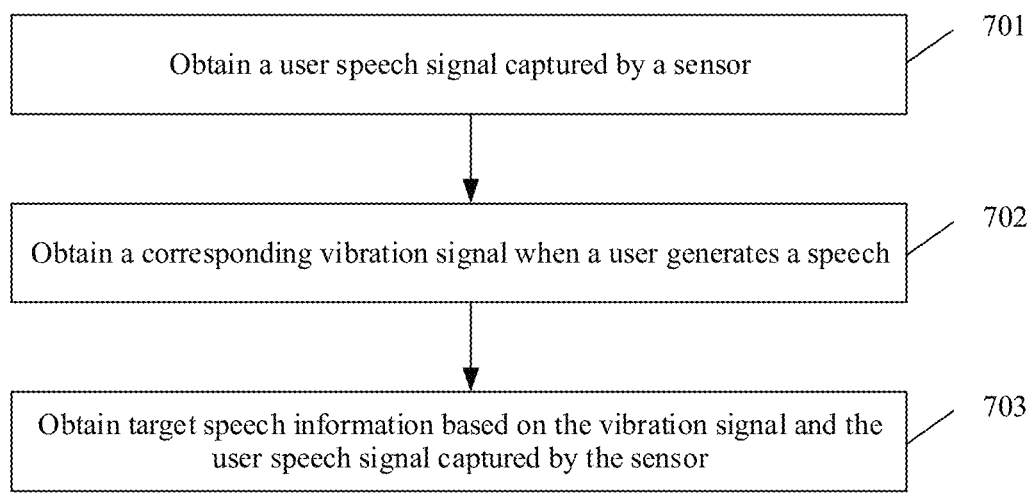
FIG. 7 is a schematic flowchart of a speech signal processing method according to an embodiment of this application.

FIG. 7 is a schematic flowchart of a speech signal processing method according to an embodiment of this application. As shown in FIG. 7, the speech signal processing method provided in this embodiment of this application includes the following steps.

701: Obtain a user speech signal captured by a sensor.

In this embodiment of this application, the user speech signal captured by the sensor from an environment may be obtained, and the speech signal includes ambient noise. The speech signal in the following may also be expressed as a voice signal.

It should be noted that, the user speech signal should not be understood as only an utterance of a user, but should be understood as that a speech signal includes a speech generated by the user.

It should be noted that, that the speech signal includes ambient noise may be understood as that a user who is speaking and other ambient noise (for example, another person who is speaking) exist in the environment. In this case, the captured speech signal includes a voice of the user and the ambient noise that are mixed together, and a relationship between the speech signal and the ambient noise should not be understood as being simply superposed. In other words, it should not be understood that the ambient noise exists as an independent signal in the speech signal.

In this embodiment of this application, an audio sensor (for example, a microphone or a microphone array) may capture the user speech signal from the environment. The user speech signal is a mixed signal z(n) in the environment. In addition to a speech signal s1($n$) sent by the user that is expected to be picked up, there are other signals such as ambient noise n(n) and a voice s2($n$) of the another person, that is, z(n)=s1($n$)+s2($n$)+n(n). In a scenario in which speech interaction and audio denoising need to be performed, it is expected that the speech signal sent by the user can be extracted from the speech signal in the environment captured by the audio sensor. In other words, the speech signal s1($n$) sent by the user is separated from the mixed signal z(n).

It should be noted that step 701 may be performed by an apparatus having a speech interaction function or a speech input apparatus. For example, an entity for performing the method is the apparatus having a speech interaction function. In an implementation, the audio sensor may be integrated into the apparatus having a speech interaction function, and then the audio sensor may obtain the audio signal including the user speech signal. In an implementation, the audio sensor may not be integrated into the apparatus having a speech interaction function. For example, the audio sensor may be integrated into another apparatus, or may be used as an independent apparatus (for example, an independent microphone). The audio sensor may transmit the captured audio signal to the apparatus having a speech interaction function. In this case, the apparatus having a speech interaction function may obtain the audio signal.

Optionally, the audio sensor may specially pick up an audio signal transmitted in a specific direction, for example, perform directional sound pickup in a direction of the user, to eliminate a portion of external noise as much as possible (but there is still noise). Directional capturing requires the microphone array or a vector microphone. Herein, the microphone array is used as an example, and a beam forming method may be used. A beamformer may be used for implementation, which may include delay-sum beam forming and filter-sum beam forming. Specifically, it is assumed that an input signal of the microphone array is $z_i(n)$, and a filter transfer coefficient is $w_i(n)$. A filter-sum beamformer output by a system is:

$$z(n) = \sum_{i=1}^{M} (w_i(n) * z_i(n - \tau_i)).$$

M indicates a quantity of microphones. When the filter coefficient is only a single weighted constant, the filter-sum beam forming is simplified to the delay-sum beam forming, that is $$z(n) = \sum_{i=1}^{M} w_i * z_i(n - \tau_i).$$

$\tau_i$ indicates delay compensation obtained through estimation. A beam of the array may be directed to any direction by controlling a value of $\tau_i$, to pick up an audio signal in the direction. If an audio signal in a direction is not expected to be picked up, the beam is directed to a direction other than the direction, and an audio signal captured after the beam is controlled based on a pickup direction is z(n).

In addition, for description of a product form of the speech input apparatus, refer to the product form of the foregoing apparatus having a speech interaction function. Details are not described herein again.

702: Obtain a corresponding vibration signal when the user generates a speech, where the vibration signal indicates a vibration feature of a body part of the user, and the body part is a part that vibrates correspondingly based on sound-making behavior when the user is making a sound.

In this embodiment of this application, the corresponding vibration signal when the user generates the speech may be obtained, where the vibration signal indicates the vibration feature of the body part when the user sends the speech signal.

It should be noted that step 701 and step 702 are not strictly subject to a specific sequence, and step 701 may be performed before, after, or at the same time of step 702. This is not limited in this application.

In this embodiment of this application, the vibration signal corresponding to the speech generated by the user may be extracted based on video.

Extracting the vibration signal from a video frame may be executed by the apparatus having a speech interaction function or the speech input apparatus. For example, extracting the vibration signal from the video frame may be executed by the apparatus having a speech interaction function.

In an implementation, a video sensor may be integrated into the apparatus having a speech interaction function. The video sensor may capture the video frame including the user. Correspondingly, the apparatus having a speech interaction function may extract, based on the video frame, the vibration signal corresponding to the user.

In an implementation, a video sensor and the apparatus having a speech interaction function may be disposed independently. The video sensor may capture the video frame including the user, and send the video frame to the apparatus having a speech interaction function. Correspondingly, the apparatus having a speech interaction function may extract, based on the video frame, the vibration signal corresponding to the user. In an implementation, a video sensor and the apparatus having a speech interaction function may be disposed independently. The video sensor may capture the video frame including the user, and send the video frame to the apparatus having a speech interaction function. Correspondingly, the apparatus having a speech interaction function may extract, based on the video frame, the vibration signal corresponding to the user.

The vibration signal from the video frame may be extracted by a server on a cloud side or another apparatus on a device side.

In an implementation, a video sensor may be integrated into the apparatus having a speech interaction function. The video sensor may capture the video frame including the user, and send the video frame to the server on a cloud side or the another apparatus on a device side. Correspondingly, the server on the cloud side or the another apparatus on the device side may extract, based on the video frame, the vibration signal corresponding to the user, and send the vibration signal to the apparatus having a speech interaction function.

In an implementation, a video sensor may be disposed independently of the apparatus having a speech interaction function. The video sensor may capture the video frame including the user, and send the video frame to the server on a cloud side or the another apparatus on a device side. Correspondingly, the server on the cloud side or the apparatus on the device side may extract, based on the video frame, the vibration signal corresponding to the user, and send the vibration signal to the apparatus having a speech interaction function.

It should be noted that the foregoing description of entities for extracting the vibration signal from the video frame are merely some examples. This is not limited in this application.

In an implementation, the video frame is captured by using a dynamic vision sensor and/or a high-speed camera. For example, the video frame is captured by using the dynamic vision sensor. In this embodiment of this application, the dynamic vision sensor may capture a video frame including a calvarium, a face, a larynx, or a neck when the user speaks.

In an implementation, there may be one or more dynamic visual sensors for capturing a video frame.

When there is one dynamic vision sensor for capturing a video frame, the dynamic vision sensor may capture a video frame that includes a full body or a partial body part of the user. In an implementation in which the dynamic vision sensor captures the video frame that includes the partial body part, the dynamic vision sensor may select, to capture the video frame, only a part that vibrates correspondingly based on sound-making behavior when the user is making a sound. The body part may be, for example, a calvarium, a face, a larynx, or a neck.

In an implementation, a video capturing direction of the dynamic vision sensor may be preset. For example, in an application scenario of a smart driving system, the dynamic vision sensor may be disposed at a preset location in a vehicle, and the video capturing direction of the dynamic vision sensor is set to a direction toward a preset body part of the user. For example, the preset body part is a face. The video capturing direction of the dynamic vision sensor may face a preset area of a driving seat. The preset area is usually an area in which the face is located when a person sits down in the driving seat.

In an implementation, the dynamic vision sensor may capture the video frame that includes the full body of the user. In this case, a video capturing direction of the dynamic vision sensor may also be preset. For example, in an application scenario of a smart driving system, the dynamic vision sensor may be disposed at a preset location in a vehicle, and the video capturing direction of the dynamic vision sensor is set to a direction toward a driving seat.

In an implementation, there are a plurality of dynamic visual sensors, and a video capturing direction of each dynamic visual sensor may be preset. In this way, each dynamic visual sensor can capture a video frame that includes one body part, where the body part is a part that vibrates correspondingly based on sound-making behavior when the user is making a sound. For example, in an application scenario of a smart driving system, the dynamic vision sensor may be deployed in front and rear of a headrest (picking up video frames of persons in front and rear directions in a vehicle), a vehicle frame (video frames of persons in left and right directions), or under a windshield (a video frame of a person in a front row).

In this embodiment of this application, a same sensor may be used to capture video frames of different body parts. For example, the high-speed camera is used, the dynamic vision sensor is used, or the two sensors are used together. This is not limited in this application.

In an application scenario of a smart household, the dynamic visual sensor may be deployed on a television, a smart large screen, a smart sound box, or the like. In an application scenario of a smartphone, the dynamic visual sensor may be deployed on a mobile phone, for example, a front-facing camera or a rear-facing camera on the mobile phone.

In this embodiment of this application, the vibration signal indicates a source feature of a human voice. Optionally, there may be a plurality of vibration signals, for example, a vibration signal $x1(n)$ of a head, a vibration signal $x2(n)$ of the larynx, a vibration signal $x3(n)$ of the face, a vibration signal of the neck $x4(n)$, and the like. In this embodiment of this application, a corresponding target audio signal may be restored based on the vibration signal.

In this embodiment of this application, the vibration signal indicates the vibration feature of the body part when the user sends the speech signal. The vibration feature may be a vibration feature directly obtained from video, or may be a vibration feature in which another action is filtered and that is related only to a sound vibration.

A video frame captured by the high-speed camera may be decomposed into image pyramids at different scales and in different directions by using filters in different directions. Specifically, an image may be first filtered by using a low-pass filter to obtain a low-pass residual image, and images at different scales are obtained through continuous downsampling on the low-pass residual image. Band-pass filters in different directions are used to filter an image at each scale, to obtain response diagrams in different directions, amplitudes and phases are calculated for the response diagrams, and local motion information of a current frame t is calculated. A first frame image is used as a reference frame. Based on results of the pyramids, phase differences between decomposition results of the current frame and the reference frame at different pixel locations at different scales and in different directions may be calculated, to quantize a local motion size of each pixel, and calculate global motion information of the current frame based on the local motion size of each pixel. The global motion information may be obtained after weighted averaging is performed on the local motion information. A weight value is an amplitude value corresponding to a scale, a direction, and a pixel location. All pixels at the scale in the direction are weighted and summed up to obtain global motion information at different scales and in different directions. Summation is performed on the foregoing global information to obtain global motion information of an image frame. Based on the foregoing steps, a motion value can be obtained from each image frame through calculation. Based on continuous frame frequencies, an amplitude corresponding to each frame is used as an audio sampling value to obtain a preliminarily restored audio signal, and then high-pass filtering is performed on the audio signal, that is, a restored audio signal x'(n) is obtained. Optionally, if there are a plurality of vibration signals, based on the foregoing method, target audio signals x1'(n), x2'(n), x3'(n), and x4'(n) corresponding to the vibration signals are separately restored.

For a video frame captured by the dynamic visual sensor, a principle of the dynamic visual sensor is that each pixel independently makes an event response to a light intensity change. By comparing current light intensity with light intensity at a moment when a previous event is generated, when a change amount (that is, a differential score) of the current light intensity and the light intensity exceeds a threshold, a new event is generated. Each event includes pixel coordinates, distribution time, and light intensity polarity. The light intensity polarity indicates a change trend of light intensity. Usually, +1 or On indicates that the light intensity is enhanced, and —1 or Off indicates that the light intensity is weakened. The dynamic vision sensor does not have a concept of exposure, and pixels are used to continuously monitor and respond to the light intensity. Therefore, a time resolution of the dynamic vision sensor can be in the microsecond level. The dynamic vision sensor is sensitive to motion, but almost does not respond to a static area. The dynamic vision sensor can be used to capture a vibration of an object, to restore a sound. In this way, an audio signal restored based on a pixel location is obtained. High-pass filtering is performed on the signal to remove low-frequency non-audio vibration interference, and the signal x'(n) is obtained, which may indicate the audio signal. Audio signals restored from a plurality of pixels, for example, all pixels, may be weighted and summed up to obtain weighted average audio signals x'(n) restored by the dynamic visual sensor. If there are a plurality of sensors or a plurality of location target areas, recovery is performed separately to obtain the respective independently restored target audio signals x1'(n), x2'(n), x3'(n), and x4'(n).

703: Obtain target speech information based on the vibration signal and the user speech signal captured by the sensor.

In this embodiment of this application, the corresponding target audio signal may be restored based on the vibration signal. The target audio signal is filtered from the audio signal through filtering to obtain a to-be-filtered signal. The to-be-filtered signal is filtered from the speech signal to obtain the target speech information, where the target speech information is a speech signal obtained after ambient noise removal processing.

Specifically, the corresponding target audio signal may be restored based on the vibration signal, and the target audio signal is filtered from the audio signal through filtering to obtain the to-be-filtered signal. After filtering, a filtered signal z'(n) no longer includes the wanted signal x'(n), and is basically external noise with the target audio signal s(n) of the user filtered. Optionally, if a plurality of cameras (a DVS, a high-speed camera, and the like) pick up vibrations of a person, the target audio signals x1'(n), x2'(n), x3'(n), and x4'(n) restored from the vibrations are filtered from the mixed audio signal z(n) in sequence by using the foregoing adaptive filtering method. In other words, the mixed audio signal z'(n) in which various audio components x1'(n), x2'(n), x3'(n), and x4'(n) are removed is obtained.

In this embodiment of this application, the to-be-filtered signal may be filtered from the audio signal to obtain the user speech signal. In an implementation, a noise spectrum (that is, it is considered that z'(n) is background noise other than the target audio signal s(n)) may be obtained. z'(n) is transformed to a frequency domain, for example, fast Fourier transform (FFT) is performed to obtain the noise spectrum. The target audio signal z(n) is transformed to the frequency domain, for example, FFT is performed to obtain a frequency spectrum. Then, the frequency spectrum is subtracted from the noise spectrum to obtain an enhanced signal spectrum of a speech. Finally, inverse fast Fourier transform (IFFT) is performed on the signal to obtain the user speech signal, that is, an enhanced speech signal.

In an implementation, the to-be-filtered signal is filtered from the audio signal in an adaptive filtering manner.

It should be noted that the foregoing manner of filtering the to-be-filtered signal from the audio signal to obtain the speech signal obtained after the ambient noise removal processing is merely some examples. This is not limited in this application.

In an implementation, instruction information corresponding to the user speech signal may be further obtained based on the target speech information, where the instruction information indicates semantic intent included in the user speech signal. The instruction information may be used to trigger an implementation of a function corresponding to the semantic intent included in the user speech signal, for example, starting an application program, making a voice call, or the like.

In an implementation, the target speech information may be obtained based on the vibration signal and the speech signal by using a neural network model.

In an implementation, the corresponding target audio signal is obtained based on the vibration signal, and the target speech information is obtained based on the target audio signal and the speech signal by using the neural network model. In other words, an input of the neural network model may alternatively be the target audio signal restored from the vibration signal.

The following describes a system architecture provided in an embodiment of this application.

Figure 8:
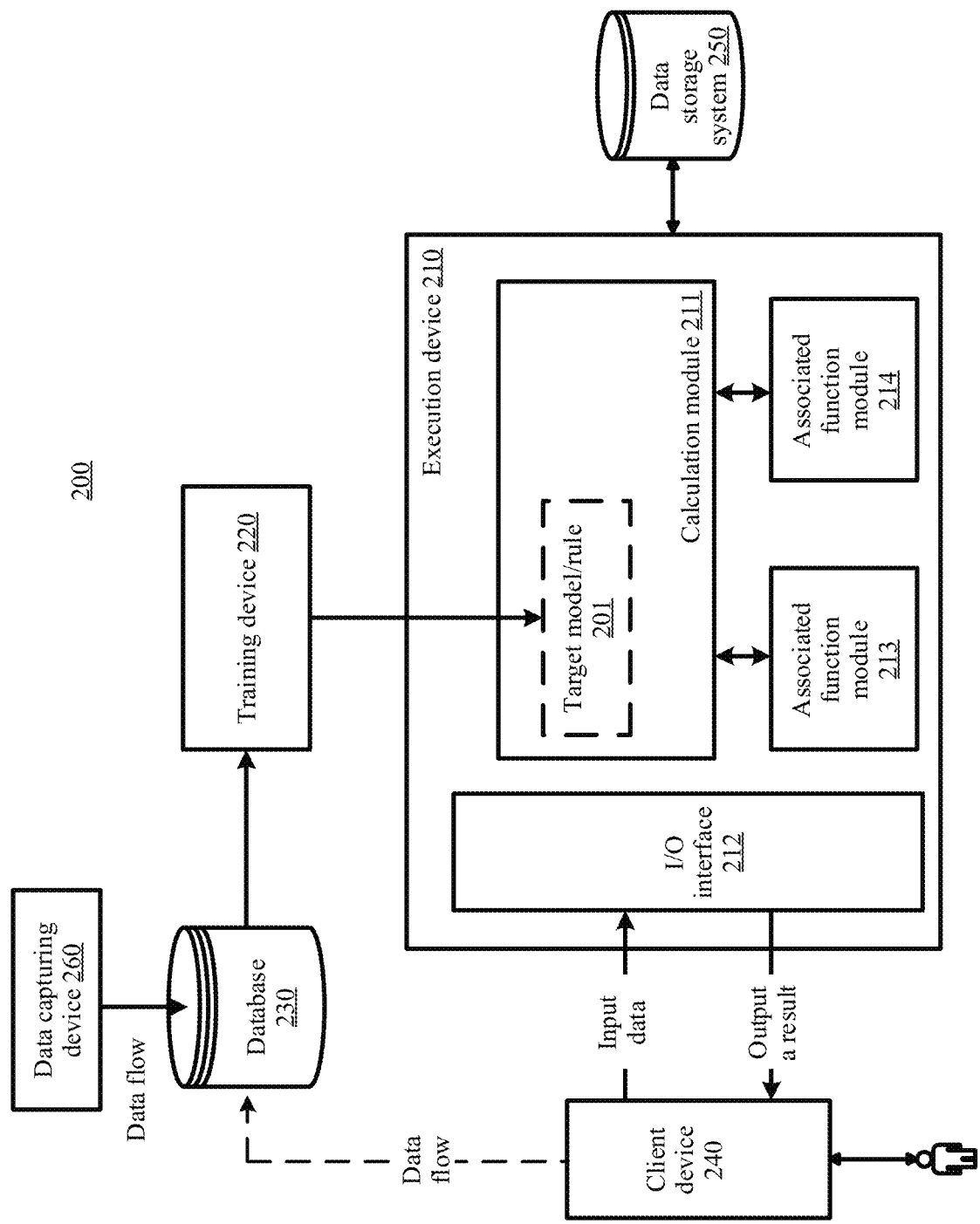
FIG. 8 is a schematic diagram of a system architecture.

Refer to FIG. 8. An embodiment of this application provides a system architecture 200. A data capturing device 260 is configured to capture audio data and store the audio data in a database 230. The audio data may include noise-free audio, a vibration signal (or a target audio signal restored from the vibration signal), and an audio signal with noise. When a person speaks/plays audio in a quiet environment, an audio signal at this moment is recorded as "noise-free audio" by using a common microphone, and is denoted as s(n). At the same time, a vibration sensor (which may be a plurality of) is used to face a head, a face, a larynx, a neck, and the like of a person, to capture a video frame during this period and obtain a corresponding vibration signal, which is denoted as x(n). If there are a plurality of sensors, signals may be denoted as x1(n), x2(n), x3(n), x4(n), and the like. Alternatively, the target audio signal is restored from the vibration signal. Various types of noise may be added to the "noise-free audio" to obtain the "audio signal with noise", which is denoted as sn(n).

The training device 220 generates a target model/rule 201 based on the audio data maintained in the database 230. The following describes in more detail how the training device 220 obtains the target model/rule 201 based on the audio data. The target model/rule 201 can obtain the target speech information or obtain the user speech signal based on the vibration signal and the audio signal.

Herein, an introduction to a training process is adaptively added based on an actual embodiment. If an inventive point is not on the training process, the introduction to the training process in the following example is used. If the training process is improved, the following introduction to the training process is replaced with the improved training process.

The training device may train data by using a deep neural network to generate the target model/rule 201. Work of each layer in the deep neural network may be described by using a mathematical expression $\vec{y} = a(W\vec{x} + b)$. From a physical perspective, the work of each layer in the deep neural network may be understood as completing transformation from input space to output space (that is, from row space to column space of a matrix) by performing five operations on the input space (a set of input vectors). The five operations include: 1. dimension increasement/dimension reduction; 2. zooming in/zooming out; 3. rotation; 4. translation; and 5. "bending". The operations 1, 2, and 3 are completed by $W\vec{x}$, the operation 4 is completed by +b, and the operation 5 is implemented by a( ). The word "space" is used herein for expression because a classified object is not a single thing, but a type of things. Space refers to a capturing of all individuals of such type of things. W is a weight vector, and each value of the vector indicates a weighting value of a neuron in this layer of neural network. The vector W determines space transformation from the input space to the output space described above. In other words, a weight at each layer controls how to transform space. A purpose of training the deep neural network is to finally obtain a weight matrix (a weight matrix formed by vectors W at a plurality of layers) at all layers of a trained neural network. Therefore, a training process for the neural network is essentially a manner of learning control of space transformation, and more specifically, learning a weight matrix.

Because an output of the deep neural network is expected to be as much as possible close to a value that actually wants to be predicted, a current predicted value of the network and an expected target value are compared. In this way, a weight vector of each layer of the neural network can be updated based on a difference between the predicted value and the target value (certainly, there is usually an initialization process before first updating, that is, a parameter is preconfigured for each layer of the deep neural network). For example, if the predicted value of the network is large, the weight vector is adjusted to obtain a smaller predicted value, and is continuously adjusted until the neural network can predict the expected target value. Therefore, "how to obtain, through comparison, a difference between the predicted value and the target value" needs to be predefined. This is a loss function or an objective function. The loss function and the objective function are important equations that measure the difference between the predicted value and the target value. The loss function is used as an example. A higher output value of the loss function indicates a larger difference. Therefore, training of the deep neural network is a process of minimizing the loss as much as possible.

The target model/rule obtained by the training device 220 may be applied to different systems or devices. In FIG. 8, an I/O interface 212 is configured for an execution device 210, to exchange data with an external device. A "user" may input data to the I/O interface 212 by using a client device 240.

The execution device 210 may invoke data, code, and the like in a data storage system 250, or may store data, instructions, and the like in the data storage system 250.

A calculation module 211 processes the input data by using the target model/rule 201.

Finally, the I/O interface 212 returns a processing result (user instruction information or a user speech signal) to the client device 240, and provides the processing result for the user.

More deeply, the training device 220 may generate, for different targets, corresponding target models/rules 201 based on different data, to provide a better result for the user.

In a case shown in FIG. 2, the user may manually specify data to be input to the execution device 210, for example, may perform an operation on an interface provided by the I/O interface 212. In another case, the client device 240 may automatically input data to the I/O interface 212 and obtain a result. If the client device 240 needs to obtain permission of the user for automatically inputting the data, the user may set corresponding permission on the client device 240. The user may view, on the client device 240, a result output by the execution device 210, and a specific presentation form may be a specific manner, for example, display, a sound, or an action. The client device 240 may be also used as a data capturing end to store the captured audio data in the database 230.

It should be noted that, FIG. 2 is merely a schematic diagram of a system architecture according to an embodiment of this application. A position relationship between devices, components, modules, and the like shown in the figure does not constitute any limitation. For example, in FIG. 2, the data storage system 250 is an external storage device relative to the execution device 210, and in another case, the data storage system 250 may alternatively be disposed in the execution device 210.

The following describes a neural network model provided in this embodiment of this application from a training side.

In a training data preparation phase, when a person speaks/plays audio in a quiet environment, an audio signal at this moment is recorded as "noise-free audio" by using a common microphone, and is denoted as s(n). At the same time, a vibration sensor (which may be a plurality of) is used to face a head, a face, a larynx, a neck, and the like of a person, to capture a visual signal during this period, which is denoted as x(n). If there are a plurality of sensors, signals may be denoted as x1(n), x2(n), x3(n), x4(n), and the like. The audio signal is restored from x(n) by using the foregoing algorithm, to obtain a "visual audio signal" captured and restored by using a visual microphone, that is, x'(n). If there are a plurality of sensors, restored audio signals are x1'(n), x2'(n), x3'(n), and x4'(n). Various types of noise are added to the "noise-free audio" to obtain an "audio signal with noise", which is denoted as sn(n).

A depth model is trained based on the captured data, and a mapping relationship between the "audio signal with noise" (z(n) captured by the microphone), a "visual vibration audio signal" (x(n) and the like that are captured by a visual vibration sensor), and a "noise-free audio signal" (enhanced speech signal s'(n)) is learned.

A deep neural network considering a time sequence relationship, for example, a recurrent neural network (RNN) or a long short-term memory (LS™) network, may be used.

Definitions of some technical terms in embodiments of this application are first provided.

(1) Neural Network

The neural network may include neurons. The neuron may be an operation unit that uses $x_s$ and an intercept of 1 as an input. An output of the operation unit may be as follows:

$$h_{W,b}(x) = f(W^T x) = f\left(\sum_{s=1}^{n} W_s x_s + b\right).$$

s=1, 2, ..., or n, n is a natural number greater than 1, $W_s$ is a weight of $x_s$, and b is bias of the neuron. f is an activation function of the neuron, used to introduce a non-linear feature into the neural network, to convert an input signal in the neuron into an output signal. The output signal of the activation function may serve as an input of a next convolution layer. The activation function may be a sigmoid function. The neural network is a network formed by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (DNN) may be understood as a neural network having a plurality of hidden layers. There is no special metric standard for "a plurality of" herein. A multi-layer neural network and the deep neural network are essentially the same. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer. Although the DNN seems complex, it is not complex in terms of work at each layer. Simply speaking, the DNN is the following linear relationship expression: $\vec{y} = a(W\vec{x} + \vec{b})$, where $\vec{x}$ is an input vector, $\vec{y}$ is an output vector, $\vec{b}$ is an offset vector, W is a weight matrix (also referred to as a coefficient), and a( ) is an activation function. At each layer, only such a simple operation is performed on the input vector $\vec{x}$ to obtain the output vector $\vec{y}$. Because the DNN has a large quantity of layers, there are a large quantity of the coefficients W and the offset vectors $\vec{b}$. How are specific parameters defined in the DNN? First, refer to the definition of the coefficient W. A three-layer DNN is used as an example. For example, a linear coefficient from the fourth neuron at the second layer to the second neuron at the third layer is defined as $w_{24}^3$. The superscript 3 represents the layer at which the coefficient W is located, and the subscript corresponds to the output third-layer index 2 and the input second-layer index 4. In conclusion, a coefficient from the $k^{th}$ neuron at the $(L-1)^{th}$ layer to the $i^{th}$ neuron at the $L^{th}$ layer is defined as $W_{jk}^L$. It is noted that the input layer has no W parameter. In the deep neural network, more hidden layers make the network more capable of describing a complex case in the real world. Theoretically, a model with more parameters has higher complexity and a larger "capacity". It indicates that the model can complete a more complex learning task.

(3) Convolutional neural network (CNN): The convolutional neural network is a deep neural network with a convolutional architecture. The convolutional neural network includes a feature extractor including a convolution layer and a sub-sampling layer. The feature extractor may be considered as a filter. A convolution process may be considered as performing convolution by using a trainable filter and an input image or a convolution feature map. The convolutional layer is a neuron layer that is in the convolutional neural network and at which convolution processing is performed on an input signal. At the convolutional layer of the convolutional neural network, one neuron may be connected to only a part of neurons at a neighboring layer. A convolutional layer usually includes several feature planes, and each feature plane may include some neurons arranged in a rectangle. Neurons of a same feature plane share a weight, and the shared weight herein is a convolution kernel. Weight sharing may be understood as that an image information extraction manner is irrelevant to a location. A principle implied herein is that statistical information of a part of an image is the same as that of another part. This means that image information learned in a part can also be used in another part. Therefore, image information obtained through same learning can be used for all locations in the image. At a same convolutional layer, a plurality of convolution kernels may be used to extract different image information. Usually, a larger quantity of convolution kernels indicates richer image information reflected by a convolution operation.

The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

(4) Recurrent Neural Network (RNN)

The RNN is used to process sequence data. In a conventional neural network model, from an input layer to a hidden layer and then to an output layer, all of the layers are connected, but none of nodes at each layer is connected. However, this common neural network is powerless for a plurality of problems. For example, to predict a next word in a sentence, a previous word usually needs to be used, because adjacent words in the sentence are not independent. A reason why the RNN is referred to as the recurrent neural network is that a current output of a sequence is also related to a previous output of the sequence. A specific representation form is that the network memorizes previous information and applies the previous information to calculation of the current output. To be specific, nodes at a hidden layer are connected, and an input of the hidden layer not only includes an output of the input layer, but also includes an output of the hidden layer at a previous moment. Theoretically, the RNN can process sequence data of any length.

RNN training is the same as conventional ANN (artificial neural network) training. A BP error backpropagation algorithm is also used, but there is a little difference. If network unfolding is performed on the RNN, parameters W, U, and V are shared, but the parameters are not shared in a conventional neural network. In addition, during use of a gradient descent algorithm, an output in each step depends not only on a network in a current step, but also on a network status in several previous steps. For example, when t=4, the output in each step further needs to be transferred three steps backward, and various gradients need to be added in the three subsequent steps. The learning algorithm is referred to as a backpropagation through time back propagation through time (BPTT) algorithm.

Now that there are artificial neural networks and convolutional neural networks, why recurrent neural networks are needed? The reason is simple. In both the convolutional neural networks and the artificial neural networks, it is assumed that elements are independent of each other, and inputs and outputs are independent of each other, such as cats and dogs. However, a plurality of elements are interconnected in the real world. For example, stocks change over time. A person says: I like traveling, my favorite place is Yunnan, and I will go to _____ in the future if there is a chance. Herein, people should know that the person will go to "Yunnan". This is inferred from the context, but it is quite difficult for a machine to achieve this. Therefore, the current recurrent neural network emerges, and its essence is to have an ability of memory like people. An output of the current recurrent neural network depends on a current input and current memory.

Figure 9:
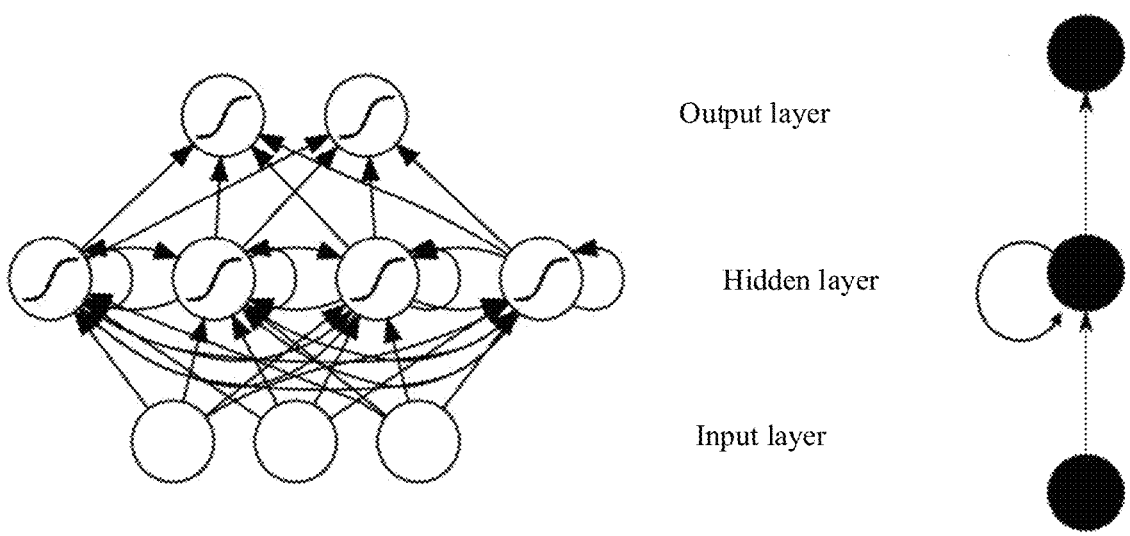
FIG. 9 is a schematic diagram of a structure of an RNN.

FIG. 9 is a schematic diagram of a structure of an RNN. Each circle may be considered as a unit, and each unit does a same thing. Therefore, the RNN may be folded to present a form shown in the left half diagram. The RNN may be explained in one sentence, that is, the RNN is reuse of a unit structure.

The RNN is a sequence-to-sequence model. It is assumed that xt−1, xt, and xt+1 are one input: "wo shi zhongguo", and then ot−1 and ot should correspond to "shi" and "zhongguo". Predict what a next word is most likely to be? There is a high probability that ot+1 should be "ren".

Therefore, the following definition may be given.

Xt indicates an input at a moment t, ot indicates an output at the moment t, and St indicates memory at the moment t. An output of a current moment is determined by the memory and an input of the current moment. For example, you are currently in a senior year, and your knowledge is a combination of knowledge (current input) learned in the senior year, and things (memory) learned in a junior year and things learned before the junior year. This is similar to the RNN. The neural network is good at integrating a large amount of content through a series of parameters and learning the parameters. Therefore, a basis of the RNN is defined: St=f(U*Xt+W*St−1).

An f( ) function is the activation function in the neural network, but why add it? For example, if you learn a very good problem-resolving method in college, do you still need to use a problem-resolving method learned in junior high school? It is clearly that the problem-resolving method is not used. An idea of the RNN is the same. As the RNN can memorize information, the RNN certainly memorizes only important information, and forgets other unimportant information. What is a best way to filter information in the neural network? It needs to be the activation function. Therefore, one activation function is used herein to perform non-linear mapping to filter the information. The activation function may be tan h or others.

It is assumed that you are in the senior year and about to graduate, and want to participate in the postgraduate entrance exam. Do you participate in the postgraduate entrance exam by first remembering what you have learned, or do you participate in the postgraduate entrance exam by directly taking several books with you? It is clearly that an idea of the RNN is to predict with the memory St of the current moment. To predict a probability that the next word occurs in "wo shi zhongguo", it is clearly herein that softmax is most suitable to predict a probability that each word occurs. However, during prediction, because a matrix cannot be directly used for prediction, a weight matrix V needs to be further used during prediction, which is expressed as the following formula:

$$ot = \text{softmax}(VSt), \text{ where } ot \text{ indicates the output at the moment } t.$$

(5) Back Propagation Algorithm

A convolutional neural network may correct a value of a parameter in an initial super-resolution model in a training process based on an error back propagation (BP) algorithm. In this way, an error loss of reconstructing the super-resolution model becomes smaller. Specifically, an input signal is transferred forward until an error loss occurs at an output, and the parameter in the initial super-resolution model is updated based on back propagation error loss information, to make the error loss converge. The back propagation algorithm is error-loss-centered back propagation motion intended to obtain a parameter, such as a weight matrix, of an optimal super-resolution model.

For example, the neural network model in this embodiment of this application is an RNN. A structure of the neural network in this embodiment of this application may be as follows.

Figure 10:
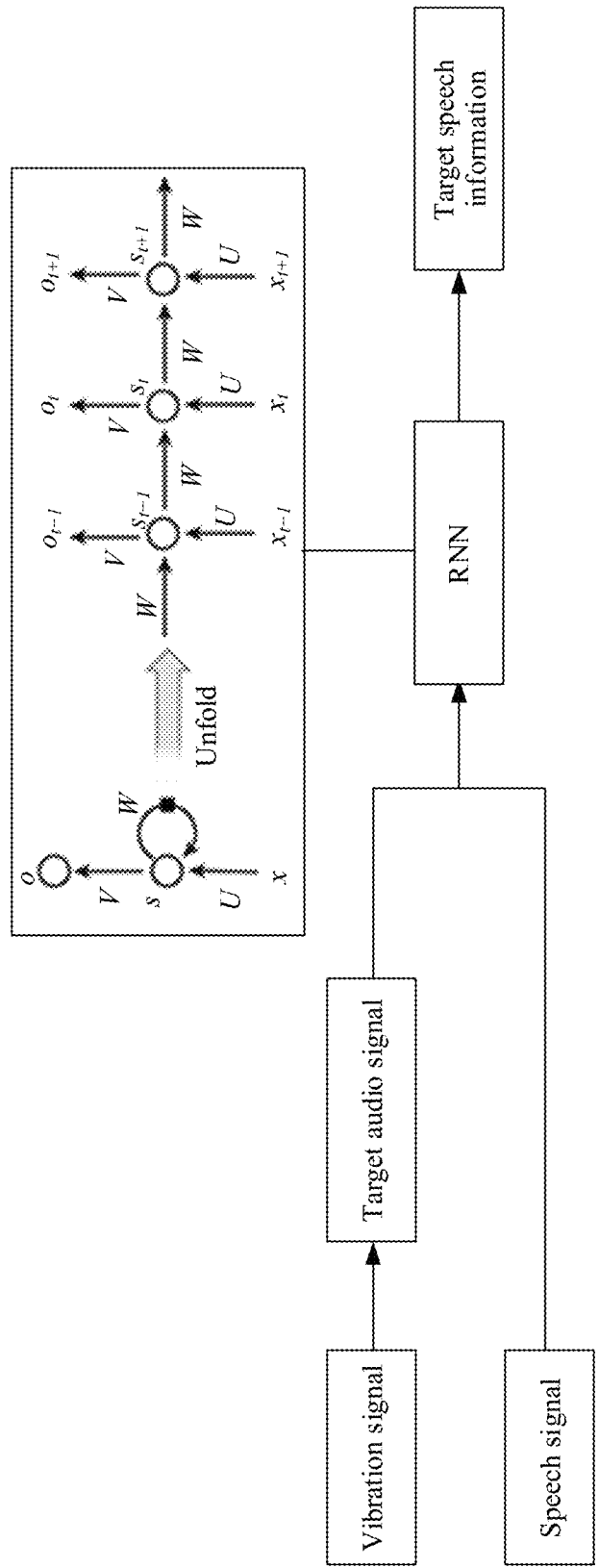
FIG. 10 is a schematic diagram of a structure of an RNN.

In an implementation, refer to FIG. 10. An input of the RNN is the target audio signal obtained based on the vibration signal and the user speech signal captured by the sensor. The target audio signal includes a plurality of moments and a signal sampling value corresponding to each moment, and the user speech signal captured by the sensor includes a plurality of moments and a signal sampling value corresponding to each moment. In an implementation, at each moment, the signal sampling value of the target audio signal and the signal sampling value of the user speech signal captured by the sensor are combined to obtain a new audio signal. The new audio signal includes a plurality of moments and a signal sampling value corresponding to each moment. The signal sampling value corresponding to each moment is obtained by combining the signal sampling value of the target audio signal and the signal sampling value of the user speech signal (a specific combination manner is not limited in this application). The new audio signal obtained through combination may be used as the input of the recurrent neural network.

In an implementation, the target audio signal may be $\{x_0, x_1, x_2, \ldots, x_t\}$, and $x_t$ is a signal sampling value of the target audio signal at a moment t. The user speech signal may be $\{y_0, y_1, y_2, \ldots, y_t\}$, and $y_t$ is a signal sampling value of the user speech signal at the moment t. During combination, signal sampling values at a corresponding moment may be combined. For example, $\{x_t, y_t\}$ is a result obtained by combining the signal sampling values at the moment t. In this case, a new audio signal obtained by combining the target audio signals may be $\{\{x_0,y_0\}, \{x_1,y_1\}, \{x_2, y_2\}, \ldots, \{x_t,y_t\}\}$.

It should be noted that the foregoing combination manner of the input audio signals is merely an example. In an actual application, a combined audio signal may express a time sequence feature of signal sampling values. A specific combination manner is not limited in this application.

It should be noted that the input of the model may be the combined audio signal. In another implementation, the input of the model may be the user speech signal captured by the sensor and the target audio signal. In this case, the audio signals may be combined by the model itself. In another implementation, the user speech signal captured by the sensor and a corresponding vibration signal when a user generates a speech may be used. A process of converting the vibration signal into the target audio signal may be implemented by the model itself. In other words, the model may first convert the vibration signal into the target audio signal, and combine the audio signals.

An obtained combined audio signal is input to the RNN. Target speech information may be output, and the target speech information may include a plurality of moments and a signal sampling value corresponding to each moment. For example, the target speech information may be $\{k_0, k_1, k_2, \ldots, k_l\}$. It should be noted that a quantity of signal sampling values (a quantity of moments) included in the target speech information may be the same as or different from a quantity of signal sampling values (a quantity of moments) included in the input audio signal. For example, if the target speech information is only speech information that is related to a human voice and that is in the user speech signal captured by the sensor, the quantity of signal sampling values included in the target speech information is less than the quantity of signal sampling values included in the input audio signal.

$s_t$ is a status of a step t of a hidden layer, and is a memory unit of the network. $s_t$ is calculated based on an output $x_t$ of a current input layer and the status $s_{t-1}$ of the hidden layer in a previous step. $s_t = f(Ux_t + Ws_{t-1})$, where $f$ is usually a non-linear activation function, for example, a tan h or ReLU function. When $s_0$ is calculated, that is, a status of the hidden layer of a feature at a first moment, $s_{-1}$ needs to be used, but does not exist, and is usually set to a 0 vector in an implementation. $o_t$ is an output of the step t, $o_t = g(Vs_t)$, where g is a linear or non-linear function.

In a model training process, data in a training sample database may be input into an initialized neural network model for training. The training sample database includes a pair of "speech signals with ambient noise", a "target audio signal", and a corresponding "noise-free audio signal". The initialized neural network model includes a weight and an offset. In a $K^{th}$ training process, an audio signal s'(n) obtained after audio features of an audio signal with noise and a visual audio signal of the sample are extracted and denoised is learned by using the neural network model adjusted for K−1 times. K is an integer greater than 0, and after the $K^{th}$ time of training, an error value between the denoised audio signal s'(n) extracted from the sample and a noise-free audio signal s(n) is obtained. A weight and an offset used in a $(K+1)^{th}$ training process are adjusted based on the error value between the denoised audio signal extracted from the sample based on a sample video frame and the noise-free audio signal.

The obtained combined audio signal includes two dimensions: the user speech signal captured by the sensor and the target audio signal. Because the user speech signal and the target audio signal are audio signals (an audio signal x'(n) needs to be restored through decoding based on the vibration signal x(n) first), MFCC of audio eigenvectors may be extracted separately. In the field of speech recognition and speaker recognition, an MFCC feature is a most widely used basic feature. The MFCC feature is based on human ear characteristics, that is, perception of a human ear of a sound frequency range above about 1000 Hz does not follow a linear relationship, but follows an approximate linear relationship on logarithmic frequency coordinates. The MFCC is a cepstrum parameter extracted from a mel-scale frequency domain. A mel scale describes a non-linear characteristic of a human ear frequency.

Extraction of the MFCC feature may include the following step: preprocessing, which includes pre-emphasis, framing, and windowing. A purpose of pre-emphasis is to eliminate impact of mouth and nose radiation during pronunciation, and improve a high-frequency part of a speech by using a high-pass filter. Because a speech signal is stable in a short time, the speech signal is divided into short time periods through framing and windowing, and each short time period is referred to as one frame. In addition, to avoid a loss of dynamic information of the speech signal, an overlapping area between adjacent frames is needed. In FFT transformation, a time domain signal obtained after framing and windowing is changed to a frequency domain, to obtain a spectrum feature X(k). After the spectrum feature X(k) of the speech frame is filtered by using a mel-scale filterbank, energy of each sub-band is obtained, a logarithm is taken for the energy of each sub-band to obtain a mel-frequency logarithmic energy spectrum S(m), and discrete cosine transform (DCT) is performed on S(m) to obtain the MFCC C(n). When an eigenvector is constructed, if there are a plurality of visual vibration audio signals, after the plurality of signals are averaged, the MFCC is extracted as the "visual audio signal". MFCC are extracted from visual/vibration audio signals, and then the coefficients are combined and connected together to form a large eigenvector. The MFCC are extracted from the visual/vibration audio signals, an average value is taken for the MFCC, and the averaged MFCC is used as the eigenvector of the "visual audio signal".

In addition to the eigenvector constructed by using all audio information described in the foregoing embodiment, the eigenvector may alternatively be constructed directly by using the vibration signal obtained from video and the audio information. In this case, the constructed audio eigenvector still includes two dimensions: the "audio signal with noise", and a "visual vibration signal" that replaces the "visual vibration audio signal". A manner of obtaining the signal is as follows: If a high-speed camera is used, four scales r (for example, 1, ¼, ¹⁄₁₆, and ¹⁄₆₄) and four directions θ (for example, up, down, left, and right) are used for each frame of image. A value of each scale and direction is as follows: $\Phi_i(r, \theta, t) = \Sigma_{x,y} A(r,\theta,x,y)^2 \varphi(r,\theta,x,y,t)$. In this way, eigenvalues of 16 pieces of vibration information are obtained, and an eigenvector $\overline{feat_{visual-v}} = [q_v^{(0)}, q_v^{(1)}, \ldots, q_v^{(m)}]$ may be formed. If a DVS sensor (brain-like camera) is used, a vibration offset S(t) of a pixel is randomly selected for a determined audio frame interval in a T/N sub-interval, for example, a T interval, and in each sub-interval, the same selection is performed to obtain 16 vibration offset values. The offset values form an eigenvector, the recombined eigenvector is used as an audio signal feature, and training is performed on the recombined eigenvector by using the RNN neural network. In addition, features extracted from three signals: the audio signal with noise, a vibration recovery signal, and the vibration signal may be further combined into an audio signal eigenvector for training.

In an implementation, a feature is directly extracted from original multi-modal data in a network and applied without using an eigenvector manner. Specifically, a deep network may be trained to learn a mapping relationship between the "audio signal with noise", the "vibration signal", and a noise-free speech signal. The RNN includes an input unit, a corresponding input set is marked as $\{x_0, x_1, x_2, \ldots, x_t, x_{t+1}, \ldots\}$, and an output set of an output unit is marked as $\{o_0, o_1, o_2, \ldots, o_t, o_{t+1}, \ldots\}$. The RNN further includes a hidden unit whose output set is marked as $\{s_0, s_1, s_2, \ldots, s_t, s_{t+1}, \ldots\}$. $x_t$ indicates an input of a step t=1, 2, 3, . . . , and the like, and corresponds to a fusion feature signal at a $t^{th}$ moment. Herein, a multimode mixed signal $x_t=[sn^{(0)}, \ldots, sn^{(t)}, sv^{(0)}, \ldots, sn^{(t)}]$ is obtained by connecting the "audio signal with noise" $\overline{S_{noise}}=[sn^{(0)}, sn^{(1)}, \ldots, sn^{(t)}]$ and the "visual vibration signal" $\overline{S_{visual}}=[sv^{(0)}, sv^{(1)}, \ldots, sv^{(t)}]$.

$s_t$ is a status of the step t of a hidden layer, and is a memory unit of the network. $s_t$ is calculated based on an output $x_t$ of a current input layer and the status $s_{t-1}$ of the hidden layer in a previous step. $s_t=f(Ux_t+Ws_{t-1})$, where f is usually a non-linear activation function, for example, a tan h or ReLU function. When $s_0$ is calculated, that is, a status of the hidden layer of a feature at a first moment, $s_{-1}$ needs to be used, but does not exist, and is usually set to a 0 vector in an implementation. $o_t$ is an output of the step t, $o_t=g(Vs_t)$, where g is a linear or non-linear function.

In a specific training process, data in a training sample database may be input into an initialized neural network model for training. The training sample database includes a pair of "audio signals with noise", a "visual vibration signal", and a corresponding "noise-free audio signal". The initialized neural network model includes a weight and an offset. In a $K^{th}$ training process, an audio signal s'(n) obtained after the audio signal with noise and the visual vibration signal of the sample are extracted and denoised is learned by using the neural network model adjusted for K−1 times. K is an integer greater than 0, and after the $K^{th}$ time of training, an error value between the denoised audio signal s'(n) extracted from the sample and the noise-free audio signal s(n) is obtained. A weight and an offset used in a $(K+1)^{th}$ training process are adjusted based on the error value between the denoised audio signal extracted from the sample based on a sample video frame and the noise-free audio signal. It should be noted that, during model training, the vibration audio signal x'(n) (and/or x1'(n), x2'(n), x3'(n), or x4'(n)) may be used to replace the visual vibration signal x(n) (and/or x1(n), x2(n), x3(n), x4(n)) for training. In other words, fusion training is performed by using the audio signal restored from the vibration signal and an audio signal captured by a microphone.

In this embodiment of this application, an output of the neural network model may be the speech signal obtained after ambient noise removal processing is performed, or user instruction information. The instruction information is determined based on the user speech signal, and the instruction information indicates intent of the user carried in the user speech signal. A device having a speech interaction function may trigger a corresponding function based on the instruction information, for example, starting an application program, and the like.

An embodiment of this application provides a speech signal processing method, including: obtaining a user speech signal captured by a sensor, where the speech signal includes ambient noise; obtaining a corresponding vibration signal when a user generates a speech, where the vibration signal indicates a vibration feature of a body part of the user, and the body part is a part that vibrates correspondingly based on sound-making behavior when the user is making a sound; and obtaining target speech information based on the vibration signal and the user speech signal captured by the sensor. In the foregoing manner, the vibration signal is used as a basis for speech recognition. Because the vibration signal does not include an external non-user speech mixed during complex acoustic transmission, and is slightly affected by other ambient noise (for example, affected by reverberation), this part of noise interference can be well suppressed, and good speech recognition effect can be achieved.

In an implementation, a brain wave signal that is of the user and that is corresponding to the user when the user generates the speech may be further obtained. Correspondingly, the target speech information may be obtained based on the vibration signal, the brain wave signal, and the speech signal. The brain wave signal of the user may be obtained by using a brain wave pickup device, where the brain wave pickup device may be an earphone, glasses, or another ear-mounted form.

In this embodiment, a mapping relationship table between a brain wave signal and motion of a vocal tract occlusion part may be established, and brain wave signals and motion signals of vocal tract occlusion when a person reads various different morphemes and statements are captured. The brain wave signals are captured by an electroencephalogram capturing device (for example, including an electrode, a front-end analog amplifier, an analog-to-digital conversion module, an electroencephalogram signal processing module, or the like) by capturing electroencephalogram signals in a plurality of brain area locations by segment based on different frequency bands. An electromyography capturing device or an optical imaging device may capture the motion signal of the vocal tract occlusion. Then, a mapping relationship between a brain wave signal and a motion signal of the vocal tract occlusion of a person in different corpus materials may be established. In this case, after the brain wave signal that is of the user and that is corresponding to the user when the user generates the speech is obtained, the motion signal of the vocal tract occlusion corresponding to the brain wave signal may be obtained according to the mapping relationship between the brain wave signal and the motion signal of the vocal tract occlusion.

In this embodiment, the brain wave signal may be converted into joint motion (motion signal) of vocal tract occlusion, and then the decoded motion is converted into a speech signal. To be specific, the brain wave signal is first converted into the motion of the vocal tract occlusion part, which relates to an anatomic structure of speech generation (such as motion signals of lips, a tongue, a larynx, and a lower jaw). To convert and map the brain wave signal to the motion of the vocal tract occlusion part, it needs to associate a large amount of motion of a vocal tract with nerve activities of a person when the person speaks. The association can be established based on a large amount of previously captured motion of the vocal tract and a large quantity of speech recording data sets by using an established recurrent neural network, and the motion signal of the vocal tract occlusion part is converted into the speech signal.

In an implementation, the target speech information may be obtained based on the vibration signal, the motion signal, and the speech signal by using a neural network model.

Figure 11:
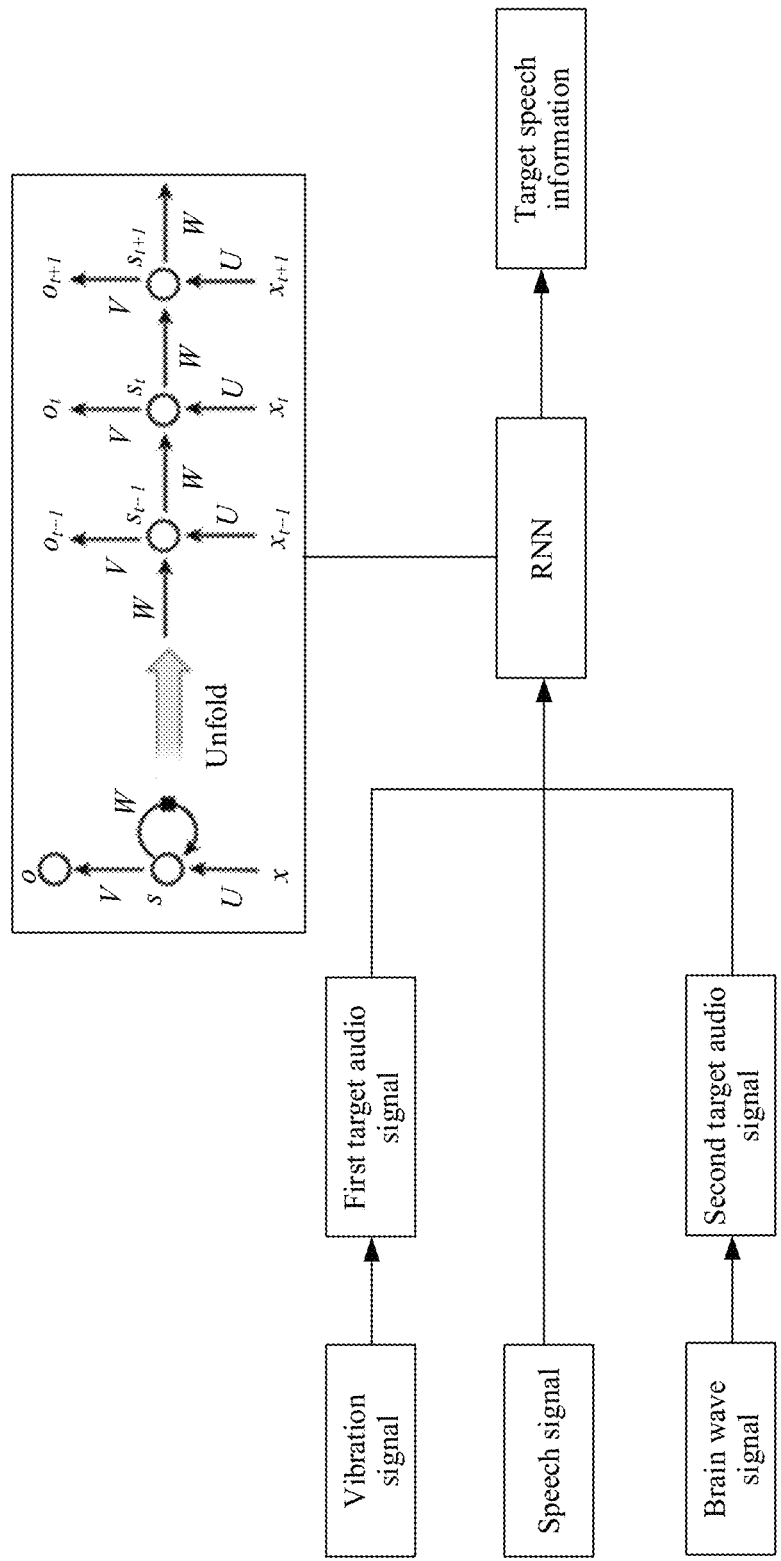
FIG. 11 is a schematic diagram of a structure of an RNN.

In an implementation, refer to FIG. 11. A corresponding first target audio signal may be obtained based on the vibration signal, a corresponding second target audio signal is obtained based on the motion signal, and the target speech information is obtained based on the first target audio signal, the second target audio signal, and the speech signal by using the neural network model. For specific implementation details, refer to description related to the neural network model in the foregoing embodiment. Details are not described herein again.

In another implementation, the speech signal may be directly mapped based on the brain wave signal, and further, the target speech information may be obtained based on the vibration signal, the brain wave signal, and the speech signal by using the neural network model.

In an implementation, refer to FIG. 11. A corresponding first target audio signal may be obtained based on the vibration signal, a corresponding second target audio signal is obtained based on the brain wave signal, and the target speech information is obtained based on the first target audio signal, the second target audio signal, and the speech signal by using the neural network model. For specific implementation details, refer to description related to the neural network model in the foregoing embodiment. Details are not described herein again.

In an implementation, the target speech information includes a voiceprint feature indicating the user speech signal.

In an implementation, the target speech information may be obtained based on the vibration signal and the speech signal by using the neural network model. The target speech information may indicate the voiceprint feature of the user speech signal, and further, the target speech information may be processed by using a fully connected layer to obtain a voiceprint recognition result.

Figure 12:
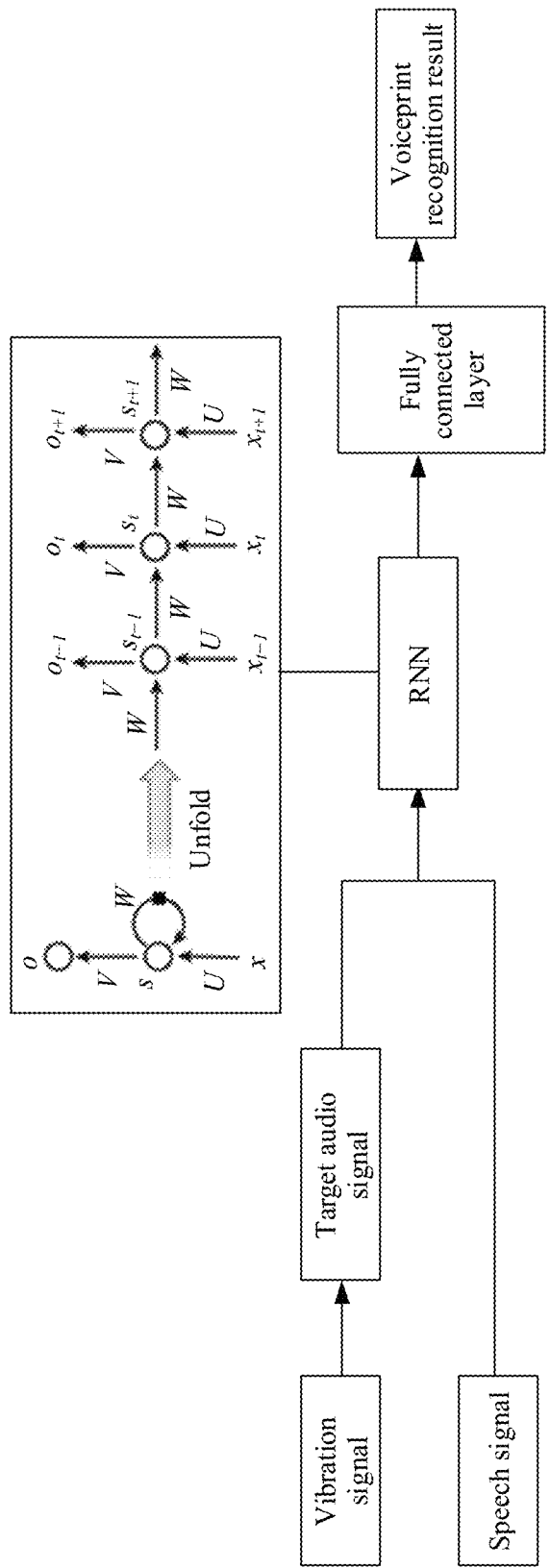
FIG. 12 is a schematic diagram of a structure of an RNN.

In an implementation, refer to FIG. 12. The corresponding target audio signal may be obtained based on the vibration signal, and the target speech information is obtained based on the target audio signal and the speech signal by using the neural network model.

In an implementation, the target speech information may be obtained based on the vibration signal, the brain wave signal, and the speech signal by using a neural network model.

Figure 13:
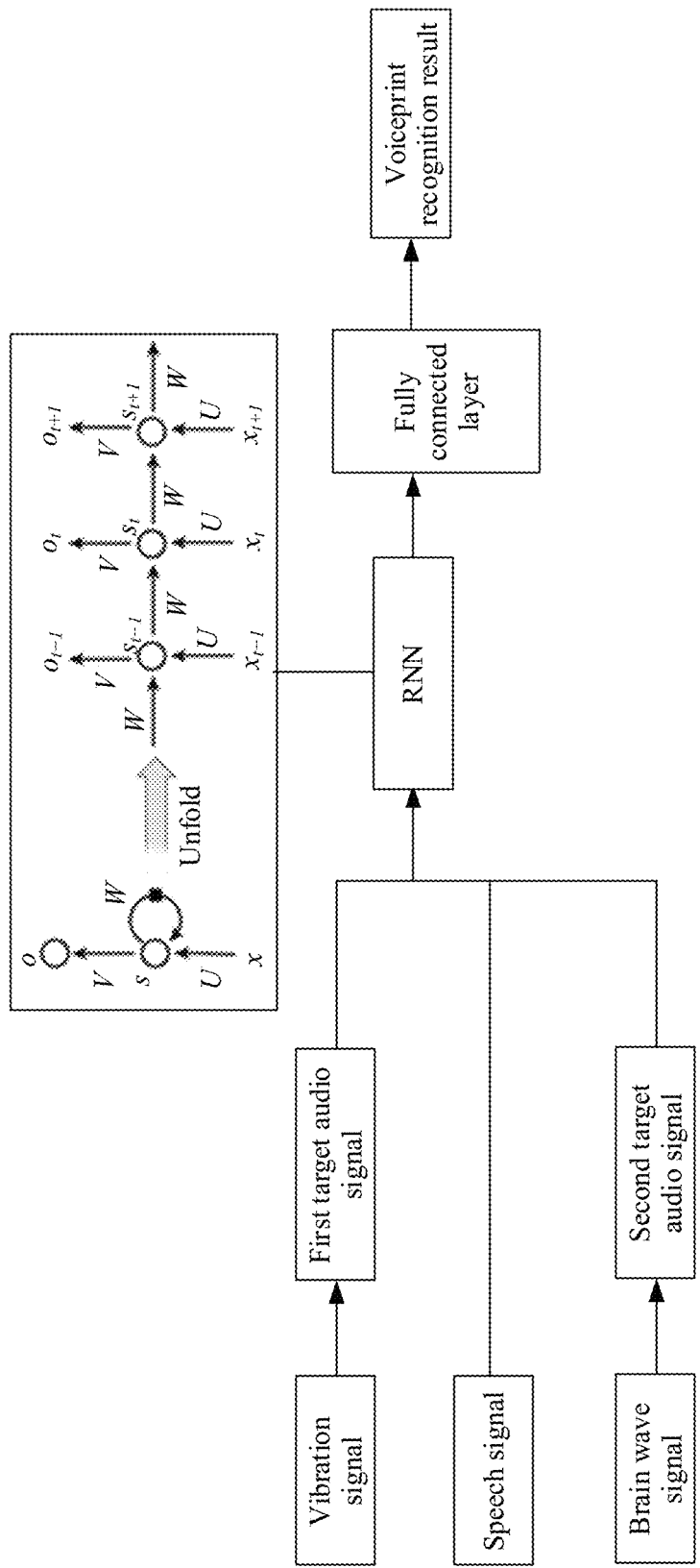
FIG. 13 is a schematic diagram of a structure of an RNN.

In an implementation, refer to FIG. 13. A corresponding first target audio signal may be obtained based on the vibration signal, a corresponding second target audio signal is obtained based on the brain wave signal, and the target speech information is obtained based on the first target audio signal, the second target audio signal, and the speech signal by using the neural network model.

For a model construction manner, refer to the description in the embodiment corresponding to FIG. 10. Details are not described herein again.

In this embodiment of this application, the vibration signal when the user speaks is used as a basis for voiceprint recognition. Because the vibration signal is slightly interfered by other noise (for example, reverberation interference, and the like), a source audio feature of the speech of the user can be expressed. Therefore, in this application, the vibration signal is used as the basis for the voiceprint recognition. In this way, recognition effect is good and reliability is high.

Figure 14:
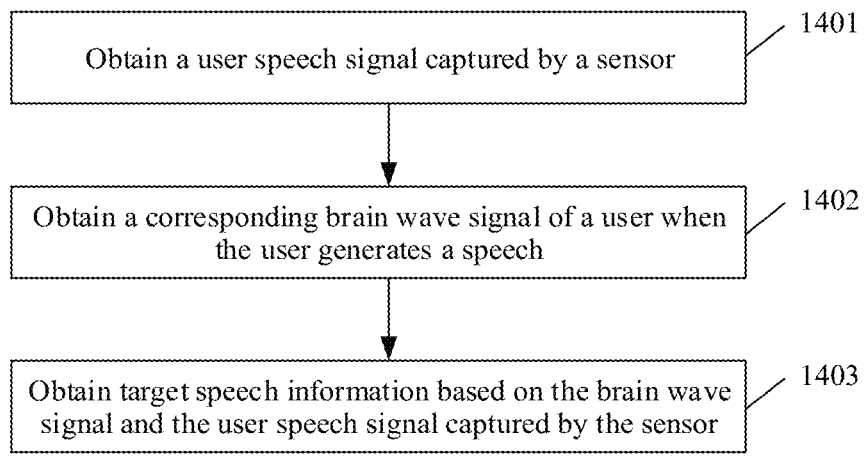
FIG. 14 is a schematic flowchart of a speech signal processing method according to an embodiment of this application.

FIG. 14 is a schematic flowchart of a speech signal processing method according to an embodiment of this application. As shown in FIG. 14, the method includes the following steps.

1401: Obtain a user speech signal captured by a sensor.

For specific description of step 1401, refer to the description of step 701. Details are not described herein again.

1402: Obtain a corresponding brain wave signal of a user when the user generates a speech.

For specific description of step 1402, refer to the specific description related to the brain wave signal in the foregoing embodiment. Details are not described herein again.

1403: Obtain target speech information based on the brain wave signal and the user speech signal captured by the sensor.

In this embodiment of this application, after the user speech signal and the user brain wave signal are obtained, the target speech information may be obtained based on the brain wave signal and the speech signal. Different from step 703, this embodiment is based on the brain wave signal and the speech signal. For how to obtain the target speech information based on the brain wave signal and the speech signal, refer to the description of step 703 in the foregoing embodiment. Details are not described herein again.

In this embodiment of this application, the motion signal of the vocal tract occlusion part when the user utters a voice may be further obtained based on the brain wave signal. Further, the target speech information may be obtained based on the motion signal and the speech signal.

Optionally, in an implementation, the target speech information is a speech signal obtained after ambient noise removal processing is performed, and a corresponding target audio signal may be obtained based on the brain wave signal. The target audio signal is filtered from the speech signal through filtering to obtain a to-be-filtered signal, and the to-be-filtered signal is filtered from the speech signal to obtain the target speech information.

Optionally, in an implementation, instruction information corresponding to the user speech signal may be obtained based on the target speech information, where the instruction information indicates semantic intent included in the user speech signal.

Optionally, in an implementation, the target speech information may be obtained based on the brain wave signal and the speech signal by using a neural network model; or a corresponding target audio signal is obtained based on the brain wave signal, and the target speech information is obtained based on the target audio signal and the speech signal by using a neural network model, where the target speech information is a speech signal obtained after ambient noise removal processing is performed or instruction information corresponding to the user speech signal.

In an implementation, the target speech information includes a voiceprint feature indicating the user speech signal.

An embodiment of this application provides a speech signal processing method, where the method includes: obtaining a user speech signal captured by a sensor; obtaining a corresponding brain wave signal of a user when the user generates a speech; and obtaining target speech information based on the brain wave signal and the user speech signal captured by the sensor. In the foregoing manner, the vibration signal is used as a basis for speech recognition. Because the vibration signal does not include an external non-user speech mixed during complex acoustic transmission, and is slightly affected by other ambient noise (for example, affected by reverberation), this part of noise interference can be well suppressed, and good speech recognition effect can be achieved.

Figure 15:
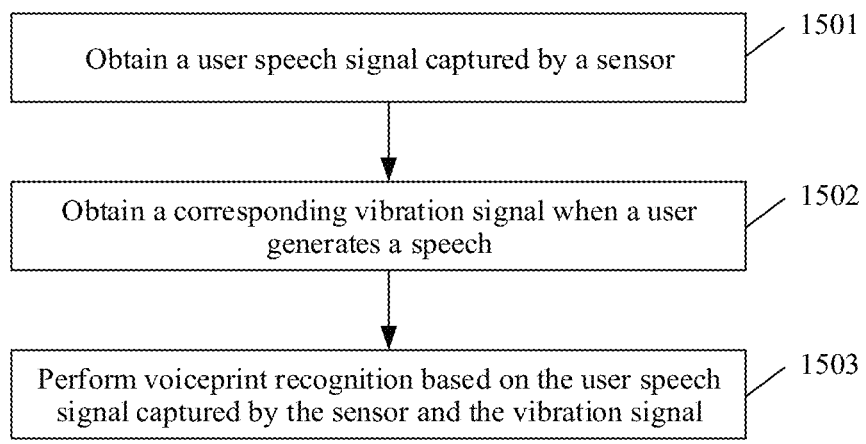
FIG. 15 is a schematic flowchart of a speech signal processing method according to an embodiment of this application.

FIG. 15 is a schematic flowchart of a speech signal processing method according to an embodiment of this application. As shown in FIG. 15, the method includes the following steps.

1501: Obtain a user speech signal captured by a sensor.

For specific description of step 1501, refer to the description of step 701. Details are not described herein again.

1502: Obtain a corresponding vibration signal when a user generates a speech, where the vibration signal indicates a vibration feature of a body part of the user, and the body part is a part that vibrates correspondingly based on sound-making behavior when the user is making a sound.

For specific description of step 1502, refer to the description of step 702. Details are not described herein again.

1503: Perform voiceprint recognition based on the user speech signal captured by the sensor and the vibration signal.

In an implementation, the vibration signal indicates a vibration feature corresponding to acoustic vibration.

In an implementation, voiceprint recognition is performed based on the user speech signal captured by the sensor to obtain a first confidence level that is of the user speech signal captured by the sensor and that belongs to the user; voiceprint recognition is performed based on the vibration signal to obtain a second confidence level that is of the user speech signal captured by the sensor and that belongs to a target user; and a voiceprint recognition result is obtained based on the first confidence level and the second confidence level. For example, the first confidence level and the second confidence level may be weighted to obtain the voiceprint recognition result.

In an implementation, a brain wave signal that is of the user and that is corresponding to the user when the user generates the speech may be obtained; a motion signal of a vocal tract occlusion part when the user generates the speech is obtained based on the brain wave signal; and further, voiceprint recognition may be performed based on the user speech signal captured by the sensor, the vibration signal, and the motion signal.

In an implementation, voiceprint recognition may be performed based on the user speech signal captured by the sensor to obtain a first confidence level that is of the user speech signal captured by the sensor and that belongs to the user; voiceprint recognition is performed based on the vibration signal to obtain a second confidence level that is of the user speech signal captured by the sensor and that belongs to the user; voiceprint recognition is performed based on the brain wave signal to obtain a third confidence level that is of the user speech signal captured by the sensor and that belongs to the user; and a voiceprint recognition result is obtained based on the first confidence level, the second confidence level and the third confidence level. For example, the first confidence level, the second confidence level and the third confidence level may be weighted to obtain the voiceprint recognition result.

In an implementation, the voiceprint recognition result may be obtained based on the audio signal, the vibration signal, and the brain wave signal by using a neural network model.

In this embodiment, if a plurality of audio signals (including a plurality of pieces of vibration information or a plurality of target audio signals restored from the brain wave signal) are restored, audio x'(n), y'(n), and x1'($n$) may be separately restored first. Voiceprint recognition is performed on x2'($n$), x3'($n$), and x4'($n$) separately, and then final results are provided by performing weighted summation on respective voiceprint recognition results:

$$VP=h1*x1+h2*x2+h3*x3+h4*x4+h5*x+h6*y+h7*s,$$

where x1, x2, x3, x4, x, y, and s herein indicate respective recognition results of the vibration signal, the brain wave signal, and the audio signal; and h1, h2, h3, h4, h5, h6, and h7 indicate weighting of corresponding recognition results, and weights may be flexibly selected. If the final recognition result VP exceeds a preset threshold VP_TH, it indicates that an audio voiceprint result obtained during vibration-based pickup is passed.

In this embodiment of this application, the vibration signal when the user speaks is used as a basis for the voiceprint recognition. Because the vibration signal is slightly interfered by other noise (for example, reverberation interference, and the like), a source audio feature of the speech of the user can be expressed. Therefore, in this application, the vibration signal is used as the basis for the voiceprint recognition. In this way, recognition effect is good and reliability is high.

Figure 16:
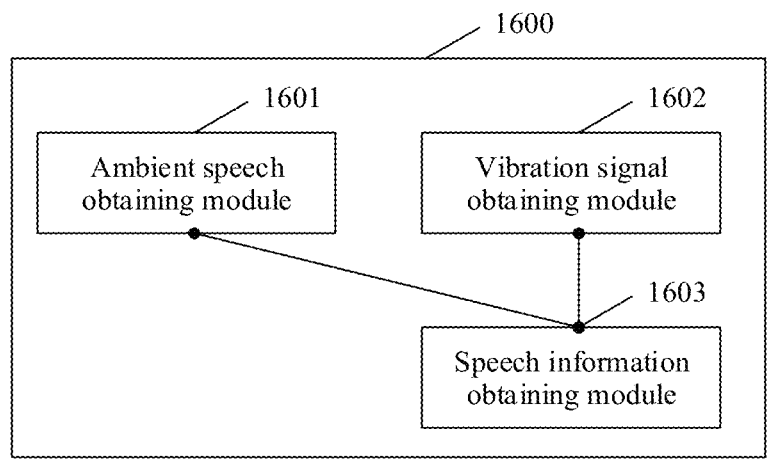
FIG. 16 is a schematic diagram of a structure of a speech signal processing apparatus according to this application.

FIG. 16 is a schematic diagram of a structure of a speech signal processing apparatus according to this application. As shown in FIG. 16, the apparatus 1600 includes:
- an ambient speech obtaining module 1601, configured to obtain a user speech signal captured by a sensor;
- a vibration signal obtaining module 1602, configured to obtain a corresponding vibration signal when a user generates a speech, where the vibration signal indicates a vibration feature of a body part of the user, and the body part is a part that vibrates correspondingly based on sound-making behavior when the user is making a sound; and
- a speech information obtaining module 1603, configured to obtain target speech information based on the vibration signal and the user speech signal captured by the sensor.

In an optional implementation, the vibration signal indicates a vibration feature corresponding to a vibration generated by generating the speech.

In an optional implementation, the body part includes at least one of the following: a calvarium, a face, a larynx, or a neck.

In an optional implementation, the vibration signal obtaining module 1602 is configured to: obtain a video frame including the user; and extract, based on the video frame, the corresponding vibration signal when the user generates the speech.

In an optional implementation, the video frame is captured by using a dynamic vision sensor and/or a high-speed camera.

In an optional implementation, the target speech information is a speech signal obtained after ambient noise removal processing is performed. The speech information obtaining module 1603 is configured to: obtain a corresponding target audio signal based on the vibration signal; filter, through filtering, the target audio signal from the user speech signal captured by the sensor to obtain a to-be-filtered-out signal; and filter the to-be-filtered-out signal from the user speech signal captured by the sensor to obtain the target speech information.

In an optional implementation, the apparatus further includes:
- an instruction information obtaining module, configured to obtain, based on the target speech information, instruction information corresponding to the user speech signal, where the instruction information indicates semantic intent included in the user speech signal.

In an optional implementation, the speech information obtaining module 1603 is configured to: obtain, based on the vibration signal and the user speech signal captured by the sensor, the target speech information by using a cyclic neural network model; or obtain a corresponding target audio signal based on the vibration signal, and obtain, based on the target audio signal and the user speech signal captured by the sensor, the target speech information by using a cyclic neural network model.

In an optional implementation, the apparatus further includes:
- a brain wave signal obtaining module, configured to obtain a corresponding brain wave signal of the user when the user generates the speech, where correspondingly, the speech information obtaining module is configured to obtain the target speech information based on the vibration signal, the brain wave signal, and the user speech signal captured by the sensor.

In an optional implementation, the apparatus further includes:
a motion signal obtaining module, configured to obtain, based on the brain wave signal, a motion signal of a vocal tract occlusion part when the user generates the speech, where correspondingly, the speech information obtaining module is configured to obtain the target speech information based on the vibration signal, the motion signal, and the user speech signal captured by the sensor.

In an optional implementation, the speech information obtaining module 1603 is configured to: obtain, based on the vibration signal, the brain wave signal, and the user speech signal captured by the sensor, the target speech information by using a cyclic neural network model; or
obtain a corresponding first target audio signal based on the vibration signal; and
obtain a corresponding second target audio signal based on the brain wave signal, and obtain, based on the first target audio signal, the second target audio signal, and the user speech signal captured by the sensor, the target speech information by using a cyclic neural network model.

In an optional implementation, the target speech information includes a voiceprint feature indicating the user speech signal.

An embodiment of this application provides a speech signal processing apparatus, where the apparatus includes: an ambient speech obtaining module, configured to obtain a user speech signal captured by a sensor; a vibration signal obtaining module, configured to obtain a corresponding vibration signal when a user generates a speech, where the vibration signal indicates a vibration feature of a body part of the user, and the body part is a part that vibrates correspondingly based on sound-making behavior when the user is making a sound; and a speech information obtaining module, configured to obtain target speech information based on the vibration signal and the user speech signal captured by the sensor. In the foregoing manner, the vibration signal is used as a basis for speech recognition. Because the vibration signal does not include an external non-user speech mixed during complex acoustic transmission, and is slightly affected by other ambient noise (for example, affected by reverberation), this part of noise interference can be well suppressed, and good speech recognition effect can be achieved.

Figure 17:
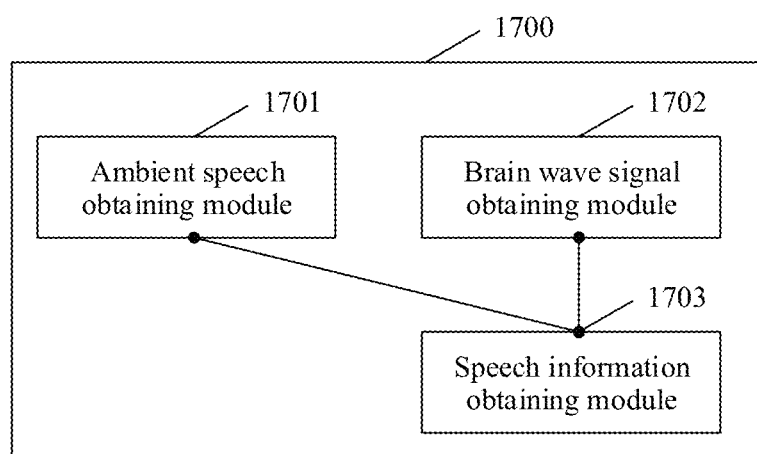
FIG. 17 is a schematic diagram of a structure of a speech signal processing apparatus according to this application.

FIG. 17 is a schematic diagram of a structure of a speech signal processing apparatus according to this application. As shown in FIG. 17, the apparatus 1700 includes:
an ambient speech obtaining module 1701, configured to obtain a user speech signal captured by a sensor;
a brain wave signal obtaining module 1702, configured to obtain a corresponding brain wave signal of a user when the user generates a speech; and
a speech information obtaining module 1703, configured to obtain target speech information based on the brain wave signal and the user speech signal captured by the sensor.

In an optional implementation, the apparatus further includes:
a motion signal obtaining module, configured to obtain, based on the brain wave signal, a motion signal of a vocal tract occlusion part when the user utters a voice, where correspondingly, the speech information obtaining module is configured to obtain the target speech information based on the motion signal and the user speech signal captured by the sensor.

In an optional implementation, the speech information obtaining module is configured to: obtain a corresponding target audio signal based on the brain wave signal;
filter, through filtering, the target audio signal from the user speech signal captured by the sensor to obtain a to-be-filtered signal; and
filter the to-be-filtered signal from the user speech signal captured by the sensor to obtain the target speech information.

In an optional implementation, the apparatus further includes:
an instruction information obtaining module, configured to obtain, based on the target speech information, instruction information corresponding to the user speech signal, where the instruction information indicates semantic intent included in the user speech signal.

In an optional implementation, the speech information obtaining module is configured to: obtain, based on the brain wave signal and the user speech signal captured by the sensor, the target speech information by using a cyclic neural network model; or
obtain a corresponding target audio signal based on the brain wave signal, and obtain, based on the target audio signal and the user speech signal captured by the sensor, the target speech information by using a cyclic neural network model.

In an optional implementation, the target speech information includes a voiceprint feature indicating the user speech signal.

An embodiment of this application provides a speech signal processing apparatus, where the apparatus includes: an ambient speech obtaining module, configured to obtain a user speech signal captured by a sensor; a brain wave signal obtaining module, configured to obtain a corresponding brain wave signal of a user when the user generates a speech; and a speech information obtaining module, configured to obtain target speech information based on the brain wave signal and the user speech signal captured by the sensor. In the foregoing manner, the brain wave signal is used as a basis for speech recognition. Because the brain wave signal does not include an external non-user speech mixed during complex acoustic transmission, and is slightly affected by other ambient noise (for example, affected by reverberation), this part of noise interference can be well suppressed, and good speech recognition effect can be achieved.

Figure 18:
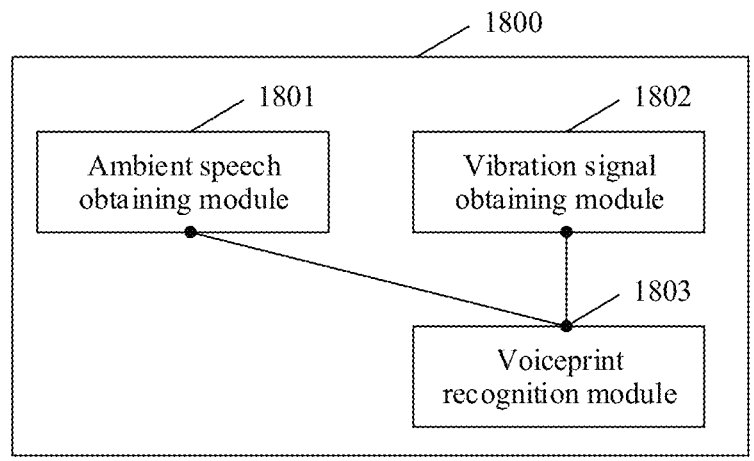
FIG. 18 is a schematic diagram of a structure of a speech signal processing apparatus according to this application.

FIG. 18 is a schematic diagram of a structure of a speech signal processing apparatus according to this application. As shown in FIG. 18, the apparatus 1800 includes:
an ambient speech obtaining module 1801, configured to obtain a user speech signal captured by a sensor;
a vibration signal obtaining module 1802, configured to obtain a corresponding vibration signal when a user generates a speech, where the vibration signal indicates a vibration feature of a body part of the user, and the body part is a part that vibrates correspondingly based on sound-making behavior when the user is making a sound; and a voiceprint recognition module 1803, configured to perform voiceprint recognition based on the user speech signal captured by the sensor and the vibration signal.

In an optional implementation, the vibration signal indicates a vibration feature corresponding to a vibration generated by generating the speech.

In an optional implementation, the voiceprint recognition module is configured to:

perform voiceprint recognition based on the user speech signal captured by the sensor to obtain a first confidence level that is of the user speech signal captured by the sensor and that belongs to the user;

perform voiceprint recognition based on the vibration signal to obtain a second confidence level that is of the user speech signal captured by the sensor and that belongs to the target user; and obtain a voiceprint recognition result based on the first confidence level and the second confidence level.

In an optional implementation, the apparatus further includes:

a brain wave signal obtaining module, configured to obtain a corresponding brain wave signal of the user when the user generates the speech, where correspondingly, the voiceprint recognition module is configured to perform voiceprint recognition based on the user speech signal captured by the sensor, the vibration signal, and the brain wave signal.

In an optional implementation, the voiceprint recognition module is configured to:

perform voiceprint recognition based on the user speech signal captured by the sensor to obtain the first confidence level that is of the user speech signal captured by the sensor and that belongs to the user;

perform voiceprint recognition based on the vibration signal to obtain the second confidence level that is of the user speech signal captured by the sensor and that belongs to the user;

perform voiceprint recognition based on the brain wave signal to obtain a third confidence level that is of the user speech signal captured by the sensor and that belongs to the user; and obtain the voiceprint recognition result based on the first confidence level, the second confidence level, and the third confidence level.

An embodiment of this application provides a speech signal processing apparatus, where the apparatus includes: an ambient speech obtaining module, configured to obtain a user speech signal captured by a sensor; a vibration signal obtaining module, configured to obtain a corresponding vibration signal when a user generates a speech, where the vibration signal indicates a vibration feature of a body part of the user, and the body part is a part that vibrates correspondingly based on sound-making behavior when the user is making a sound; and a voiceprint recognition module, configured to perform voiceprint recognition based on the user speech signal captured by the sensor and the vibration signal. In this embodiment of this application, the vibration signal when the user speaks is used as a basis for the voiceprint recognition. Because the vibration signal is slightly interfered by other noise (for example, reverberation interference, and the like), a source audio feature of the speech of the user can be expressed. Therefore, in this application, the vibration signal is used as the basis for the voiceprint recognition. In this way, recognition effect is good and reliability is high.

Figure 19:
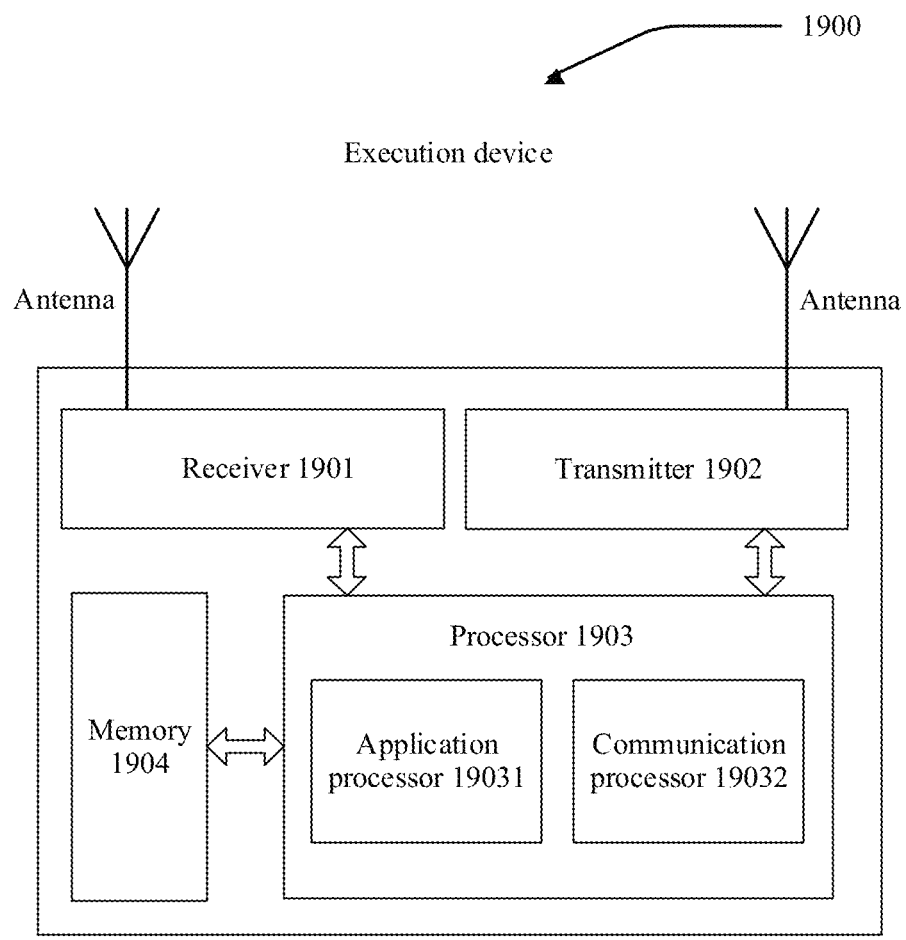
FIG. 19 is a schematic diagram of a structure of an execution device according to an embodiment of this application.

The following describes an execution device provided in an embodiment of this application. The execution device may be the apparatus having a speech interaction function or the speech input device in the foregoing embodiment. FIG. 19 is a schematic diagram of a structure of an execution device according to an embodiment of this application, the execution device 1900 may be specifically represented as a mobile phone, a tablet computer, a notebook computer, an intelligent wearable device, a server, or the like. This is not limited herein. A task scheduling apparatus described in the embodiment corresponding to FIG. 10 may be deployed on the execution device 1900, and is configured to implement a task scheduling function in the embodiment corresponding to FIG. 10. Specifically, the execution device 1900 includes a receiver 1901, a transmitter 1902, a processor 1903, and a memory 1904 (the execution device 1900 may include one or more processors 1903, and one processor is used as an example in FIG. 19). The processor 1903 may include an application processor 19031 and a communication processor 19032. In some embodiments of this application, the receiver 1901, the transmitter 1902, the processor 1903, and the memory 1904 may be connected through a bus or in another manner.

The memory 1904 may include a read-only memory and a random access memory, and provides instructions and data for the processor 1903. A part of the memory 1904 may further include a non-volatile random access memory (non-volatile random access memory, NVRAM). The memory 1904 stores a processor and operation instructions, an executable module or a data structure, or a subset thereof or an extended set thereof. The operation instructions may include various operation instructions for implementing various operations.

The processor 1903 controls an operation of the execution device. In a specific application, the components of the execution device are coupled together through a bus system. In addition to a data bus, the bus system may further include a power bus, a control bus, a status signal bus, and the like. However, for clear description, various types of buses in the figure are marked as the bus system.

The methods disclosed in the foregoing embodiments of this application may be applied to the processor 1903, or may be implemented by the processor 1903. The processor 1903 may be an integrated circuit chip, and has a signal processing capability. In an implementation process, the steps in the foregoing methods may be implemented by using a hardware integrated logical circuit in the processor 1903, or by using instructions in a form of software. The processor 1903 may be a general-purpose processor, a digital signal processor (DSP), a microprocessor or a microcontroller, and may further include an application-specific integrated circuit (ASIC), a field programmable gate array (FPGA) or another programmable logic device, a discrete gate or transistor logic device, or a discrete hardware component. The processor 1903 may implement or perform the methods, steps, and logical block diagrams that are disclosed in embodiments of this application. The general-purpose processor may be a microprocessor, or the processor may be any conventional processor or the like. Steps of the methods disclosed with reference to embodiments of this application may be directly performed by a hardware decoding processor, or may be performed by using a combination of hardware and software modules in the decoding processor. The software module may be located in a mature storage medium in the art, for example, a random access memory, a flash memory, a read-only memory, a programmable read-only memory, an electrically erasable programmable memory, a register, or the like. The storage medium is located in the memory 1904, and the processor 1903 reads information in the memory 1904 and completes the steps in the foregoing methods in combination with hardware in the processor 1903.

The receiver 1901 may be configured to: receive an input digit or character information, and generate a signal input related to a related setting and function control of the execution device. The transmitter 1902 may be configured to output a digit or character information through a first interface. The transmitter 1902 may be further configured to send instructions to a disk group through the first interface to modify data in the disk group. The transmitter 1902 may further include a display device such as a display.

In this embodiment of this application, in one case, the processor 1903 is configured to perform the speech signal processing method performed by the execution device in embodiments corresponding to FIG. 7, FIG. 14, and FIG. 15.

Figure 20:
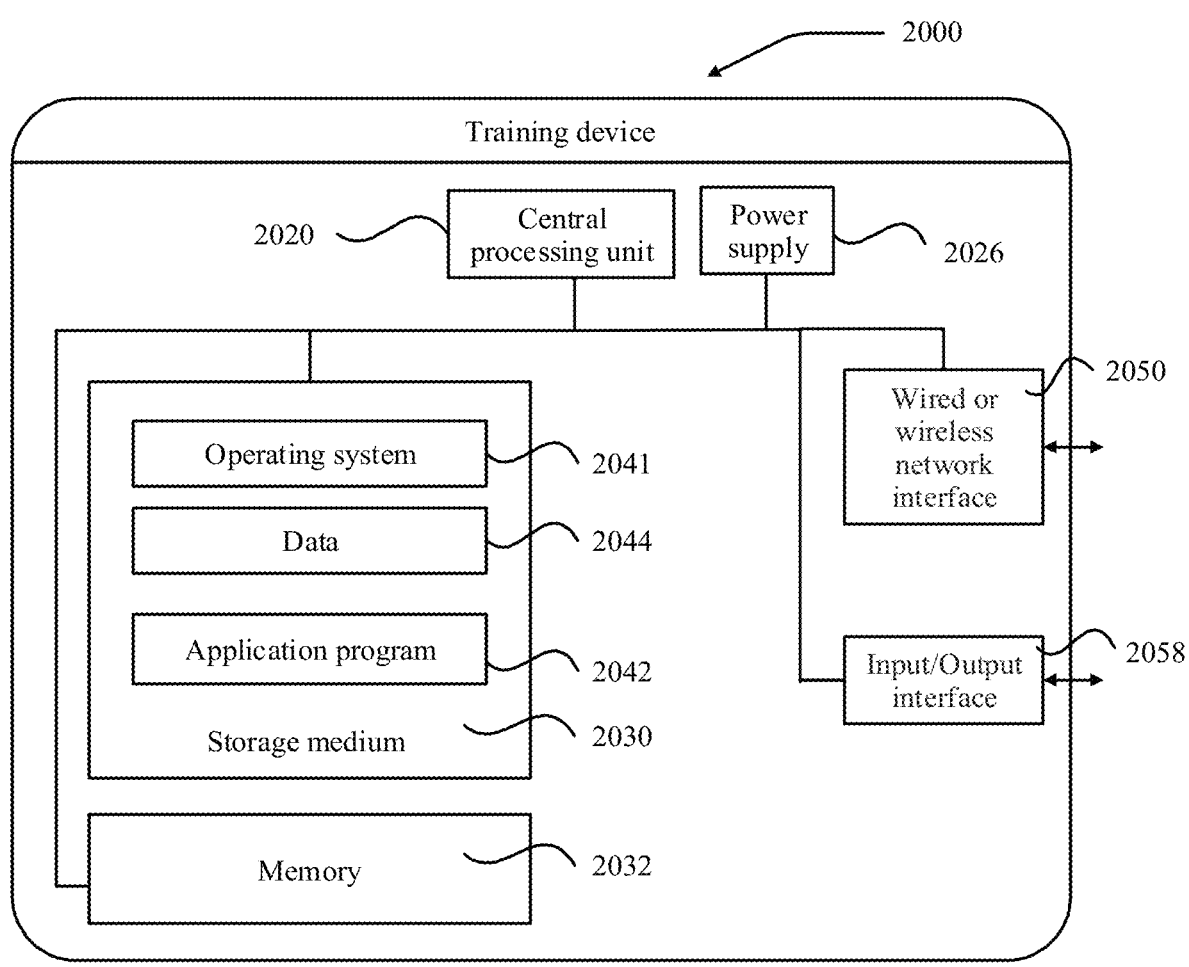
FIG. 20 is a schematic diagram of a structure of a training device according to an embodiment of this application.

An embodiment of this application further provides a training device. FIG. 20 is a schematic diagram of a structure of a training device according to an embodiment of this application. Specifically, the training device 2000 is implemented by one or more servers. The training device 2000 may have a large difference due to different configurations or performance, and may include one or more central processing units (CPU) 2020 (for example, one or more processors), a memory 2032, and one or more storage media 2030 (for example, one or more massive storage devices) that store an application program 2042 or data 2044. The memory 2032 and the storage medium 2030 may be used for temporary storage or permanent storage. The program stored in the storage medium 2030 may include one or more modules (not shown in the figure), and each module may include a series of instruction operations for the training device. Further, the central processing unit 2020 may be configured to: communicate with the storage medium 2030, and perform, on the training device 2000, the series of instruction operations in the storage medium 2030.

The training device 2000 may further include one or more power supplies 2026, one or more wired or wireless network interfaces 2050, one or more input/output interfaces 2058, or one or more operating systems 2041, such as Windows Server™, Mac OS X™, Unix™, Linux™ and FreeBSD™.

In this embodiment of this application, the central processing unit 2020 is configured to perform the steps related to the neural network model training method in the foregoing embodiment.

An embodiment of this application further provides a computer program product. When the computer program product runs on a computer, the computer is enabled to perform the steps performed by the foregoing execution device, or the computer is enabled to perform the steps performed by the foregoing training device.

An embodiment of this application further provides a computer-readable storage medium. The computer-readable storage medium stores a program for signal processing. When the program is run on a computer, the computer is enabled to perform the steps performed by the foregoing execution device, or the computer is enabled to perform the steps performed by the foregoing training device.

The execution device, the training device, or the terminal device provided in embodiments of this application may be specifically a chip. The chip includes a processing unit and a communication unit. The processing unit may be, for example, a processor, and the communication unit may be, for example, an input/output interface, a pin, a circuit, or the like. The processing unit may execute computer-executable instructions stored in a storage unit. In this way, a chip in the execution device performs the speech signal processing methods described in the foregoing embodiments, or a chip in the training device performs the speech signal processing methods described in the foregoing embodiments. Optionally, the storage unit is a storage unit in the chip, for example, a register or a cache; or the storage unit may be a storage unit that is in a radio access device end and that is located outside the chip, for example, a read-only memory (ROM), another type of static storage device that can store static information and instructions, a random access memory (RAM), or the like.

Figure 21:
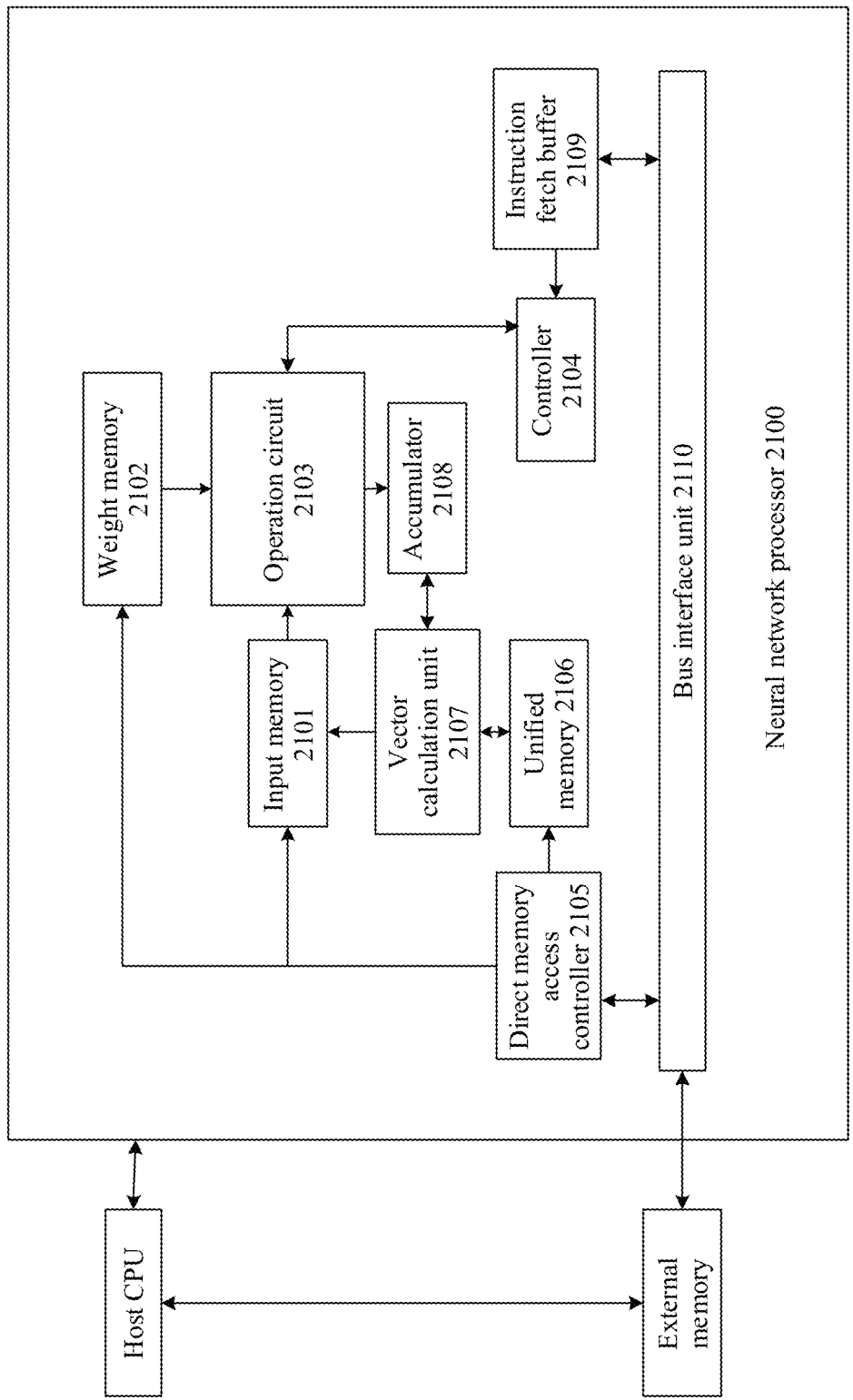
FIG. 21 is a schematic diagram of a structure of a chip according to an embodiment of this application.

Specifically, refer to FIG. 21. FIG. 21 is a schematic diagram of a structure of a chip according to an embodiment of this application. The chip may be represented as a neural network processing unit NPU 2100. The NPU 2100 is mounted to a host CPU as a coprocessor, and the host CPU allocates a task. A core part of the NPU is an operation circuit 2103, and a controller 2104 controls the operation circuit 2103 to extract matrix data in a memory and perform a multiplication operation.

In some implementations, the operation circuit 2103 internally includes a plurality of processing units (Process Engine, PE). In some implementations, the operation circuit 2103 is a two-dimensional systolic array. Alternatively, the operation circuit 2103 may be a one-dimensional systolic array or another electronic circuit that can perform mathematical operations such as multiplication and addition. In some implementations, the operation circuit 2103 is a general-purpose matrix processor.

For example, it is assumed that there is an input matrix A, a weight matrix B, and an output matrix C. The operation circuit fetches data corresponding to the matrix B from a weight memory 2102, and buffers the data on each PE in the operation circuit. The operation circuit fetches data of the matrix A from an input memory 2101 to perform a matrix operation on the matrix B, to obtain a partial result or a final result of the matrix, which is stored in an accumulator 2018.

A unified memory 2106 is configured to store input data and output data. Weight data is directly transferred to the weight memory 2102 by using a direct memory access controller (DMAC) 2105. The input data is also transferred to the unified memory 2106 by using the DMAC.

A BIU, bus interface unit, that is, a bus interface unit 2110, is configured for interaction between an AXI bus and the DMAC and interaction between the AXI bus and an instruction fetch buffer (IFB) 2109.

The bus interface unit 2110 (BIU for short) is configured to obtain instructions from an external memory by the instruction fetch buffer 2109, and is further configured to obtain original data of the input matrix A or the weight matrix B from the external memory by the direct memory access controller 2105.

The DMAC is mainly configured to transfer input data in the external memory DDR to the unified memory 2106, transfer weight data to the weight memory 2102, or transfer input data to the input memory 2101.

A vector calculation unit 2107 includes a plurality of operation processing units. If necessary, further processing, for example, vector multiplication, vector addition, exponential operation, logarithmic operation, and size comparison is performed on an output of the operation circuit 2103. The vector calculation unit 1907 is mainly configured to perform network computing, such as batch normalization, pixel-level summation, and upsampling of a feature plane, on a non-convolutional/fully connected layer in a neural network.

In some implementations, the vector calculation unit 2107 can store a processed output vector in the unified memory 2106. For example, the vector calculation unit 2107 may apply a linear function or a non-linear function to the output of the operation circuit 2103, for example, perform linear interpolation on a feature plane extracted by a convolutional layer, for another example, add value vectors to generate an activation value. In some implementations, the vector calculation unit 2107 generates a normalized value, a pixel-level summation value, or both. In some implementations, the processed output vector can be used as an activation input for the operation circuit 2103, for example, used in a subsequent layer in the neural network.

The instruction fetch buffer 2109 connected to the controller 2104 is configured to store instructions used by the controller 2104.

The unified memory 2106, the input memory 2101, the weight memory 2102, and the instruction fetch buffer 2109 are all on-chip memories. The external memory is private for an NPU hardware architecture.

The processor mentioned anywhere above may be a general-purpose central processing unit, a microprocessor, an ASIC, or one or more integrated circuits configured to control program execution.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected based on an actual requirement to achieve the objectives of the solutions of embodiments. In addition, in the accompanying drawings of the apparatus embodiments provided in this application, connection relationships between the modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any function performed by a computer program can be easily implemented by using corresponding hardware, and a specific hardware structure used to achieve a same function may be of various forms, for example, in a form of an analog circuit, a digital circuit, an application-specific circuit, or the like. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or some of foregoing embodiments may be implemented by using software, hardware, firmware, or any combination thereof. When the software is used to implement embodiments, all or a part of embodiments may be implemented in a form of a computer program product.

The computer program product includes one or more computer instructions. When the computer program instructions are loaded and executed on the computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

What is claimed is:

1. A speech signal processing method, wherein the method comprises:
    obtaining a user speech signal captured by a sensor;
    obtaining a corresponding vibration signal when a user generates the speech signal, wherein the vibration signal indicates a vibration feature of a body part of the user, and the body part is a part that vibrates based on sound-making behavior when the user is making a sound;
    obtaining a corresponding brain wave signal of the user when the user generates the speech signal; and
    determining target speech information based on the vibration signal, the user speech signal captured by the sensor, and the brain wave signal, or performing voiceprint recognition based on the user speech signal captured by the sensor, the vibration signal, and the brain wave signal.

2. The method according to claim 1, wherein the vibration signal indicates a vibration feature corresponding to a vibration generated when the user generates the speech signal.

3. The method according to claim 1, wherein the body part comprises at least one of the following: a calvarium, a face, a larynx, or a neck.

4. The method according to claim 1, wherein the obtaining a corresponding vibration signal when a user generates the speech signal comprises:
    obtaining a video frame comprising the user; and
    extracting, based on the video frame, the corresponding vibration signal when the user generates the speech signal.

5. The method according to claim 4, wherein the video frame is captured using a dynamic vision sensor or a high-speed camera.

6. The method according to claim 1, wherein the determining target speech information based on the vibration signal and the user speech signal captured by the sensor comprises:
    obtaining a corresponding target audio signal based on the vibration signal;
    filtering the target audio signal from the user speech signal captured by the sensor to obtain a to-be-filtered signal; and
    filtering the to-be-filtered signal from the user speech signal captured by the sensor to obtain the target speech information.

7. The method according to claim 1, wherein the determining target speech information based on the vibration signal and the user speech signal captured by the sensor comprises:

determining, based on the vibration signal and the user speech signal captured by the sensor, the target speech information by using a cyclic neural network model; or determining a corresponding target audio signal based on the vibration signal, and determining, based on the target audio signal and the user speech signal captured by the sensor, the target speech information by using a cyclic neural network model.

8. The method according to claim 1, wherein the method further comprises:

obtaining, based on the brain wave signal, a motion signal of a vocal tract occlusion part when the user generates the speech; and correspondingly, the determining the target speech information based on the vibration signal, the brain wave signal, and the user speech signal captured by the sensor comprises:

determining the target speech information based on the vibration signal, the motion signal, and the user speech signal captured by the sensor.

9. The method according to claim 1, wherein the determining the target speech information based on the vibration signal, the brain wave signal, and the user speech signal captured by the sensor comprises:

determining, based on the vibration signal, the brain wave signal, and the user speech signal captured by the sensor, the target speech information by using a cyclic neural network model; or determining a corresponding first target audio signal based on the vibration signal; and determining a corresponding second target audio signal based on the brain wave signal, and determining, based on the first target audio signal, the second target audio signal, and the user speech signal captured by the sensor, the target speech information by using a cyclic neural network model.

10. The method according to claim 1, wherein the performing voiceprint recognition based on the user speech signal captured by the sensor, the vibration signal, and the brain wave signal comprises:

performing voiceprint recognition based on the user speech signal captured by the sensor to obtain a first confidence level that the user speech signal captured by the sensor belongs to the user;

performing voiceprint recognition based on the vibration signal to obtain a second confidence level that the user speech signal captured by the sensor belongs to the user;

performing voiceprint recognition based on the brain wave signal to obtain a third confidence level that the user speech signal captured by the sensor belongs to the user; and determining the voiceprint recognition result based on the first confidence level, the second confidence level, and the third confidence level.

11. The method according to claim 1, wherein the performing voiceprint recognition based on the user speech signal captured by the sensor and the vibration signal comprises:

performing voiceprint recognition based on the user speech signal captured by the sensor to obtain a first confidence level that the user speech signal captured by the sensor belongs to a target user;

performing voiceprint recognition based on the vibration signal to obtain a second confidence level that the user speech signal captured by the sensor belongs to the target user; and determining a voiceprint recognition result based on the first confidence level and the second confidence level.

12. A speech signal processing apparatus, comprising:

a memory storing executable instructions; and a processor configured to execute the executable instructions to perform operations of:

obtaining a user speech signal captured by a sensor;

obtaining a corresponding vibration signal when a user generates the speech signal, wherein the vibration signal indicates a vibration feature of a body part of the user, and the body part is a part that vibrates based on sound-making behavior when the user is making a sound;

obtaining a corresponding brain wave signal of the user when the user generates the speech signal; and determining target speech information based on the vibration signal, the user speech signal captured by the sensor, and the brain wave signal, or performing voiceprint recognition based on the user speech signal captured by the sensor, the vibration signal, and the brain wave signal.

13. The apparatus according to claim 12, wherein the body part comprises at least one of the following: a calvarium, a face, a larynx, or a neck.

14. The apparatus according to claim 12, wherein the processor is further configured to execute the executable instructions to perform operations of:

obtaining a video frame comprising the user; and extracting, based on the video frame, the corresponding vibration signal when the user generates the speech signal.

15. The apparatus according to claim 12, wherein the processor is further configured to execute the executable instructions to perform operations of:

obtaining a corresponding target audio signal based on the vibration signal;

filtering the target audio signal from the user speech signal captured by the sensor to obtain a to-be-filtered signal; and filtering the to-be-filtered signal from the user speech signal captured by the sensor to obtain the target speech information.

16. The apparatus according to claim 12, wherein the processor is further configured to execute the executable instructions to perform operations of:

determining, based on the vibration signal and the user speech signal captured by the sensor, the target speech information by using a cyclic neural network model; or determining a corresponding target audio signal based on the vibration signal, and determining, based on the target audio signal and the user speech signal captured by the sensor, the target speech information by using a cyclic neural network model.

17. The apparatus according to claim 12, wherein the processor is further configured to execute the executable instructions to perform operations of:

obtaining, based on the brain wave signal, a motion signal of a vocal tract occlusion part when the user generates the speech; and correspondingly, the determining the target speech information based on the vibration signal, the brain wave signal, and the user speech signal captured by the sensor comprises:

determining the target speech information based on the vibration signal, the motion signal, and the user speech signal captured by the sensor.

18. A non-transitory computer-readable storage medium, comprising a program, wherein when the program runs on a computer, the computer is enabled to perform:

obtaining a user speech signal captured by a sensor;

obtaining a corresponding vibration signal when a user generates the speech signal, wherein the vibration signal indicates a vibration feature of a body part of the user, and the body part is a part that vibrates based on sound-making behavior when the user is making a sound;

obtaining a corresponding brain wave signal of the user when the user generates the speech signal; and determining target speech information based on the vibration signal, the user speech signal captured by the sensor, and the brain wave signal, or performing voice-print recognition based on the user speech signal captured by the sensor, the vibration signal, and the brain wave signal.

19. The non-transitory computer-readable storage medium of claim 18, wherein the obtaining a corresponding vibration signal when a user generates the speech signal comprises:

obtaining a video frame comprising the user; and extracting, based on the video frame, the corresponding vibration signal when the user generates the speech signal.

20. The non-transitory computer-readable storage medium of claim 18, wherein the method further comprises:

obtaining, based on the brain wave signal, a motion signal of a vocal tract occlusion part when the user generates the speech; and correspondingly, the determining the target speech information based on the vibration signal, the brain wave signal, and the user speech signal captured by the sensor comprises:

determining the target speech information based on the vibration signal, the motion signal, and the user speech signal captured by the sensor.

* * * * *